(12) United States Patent
Oka et al.

(10) Patent No.: US 10,379,417 B2
(45) Date of Patent: Aug. 13, 2019

(54) DISPLAY DEVICE

(71) Applicant: Japan Display Inc., Tokyo (JP)

(72) Inventors: Shinichiro Oka, Tokyo (JP); Yosuke Hyodo, Tokyo (JP); Lu Jin, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/888,391

(22) Filed: Feb. 5, 2018

(65) Prior Publication Data

US 2018/0239209 A1    Aug. 23, 2018

(30) Foreign Application Priority Data

Feb. 23, 2017 (JP) ................................. 2017-031993

(51) Int. Cl.
*G02F 1/1343* (2006.01)
*G02F 1/1333* (2006.01)
(Continued)

(52) U.S. Cl.
CPC ...... *G02F 1/136286* (2013.01); *G02F 1/1339* (2013.01); *G02F 1/134309* (2013.01);
(Continued)

(58) Field of Classification Search
CPC .............. G02F 1/1335; G02F 1/133524; G02F 1/1368; G02F 1/136286; G02F 1/134363; G02F 1/134309; G02F 1/133707; G02F 1/134336; G02F 1/133305; G02F 1/13439; G02F 1/13454; G02F 1/1345; G02F 1/13458; G02F 1/13452; G02F 1/1362; G02F 1/133615; G02F 1/1339; G02F 1/13306; G02F 1/1333; G02F 1/1343; G02F 2201/123; G02F 2001/133388; G02F 2202/28; G02F 1/133512; H01L 27/3276; H01L 27/124; H01L 27/1218; H01L 51/0097; H01L 51/5203; H01L 2251/5338; H01L 23/562; H01L 23/4985; H01L 23/5387; G06F 2203/04102; G06F 1/1618; G06F 1/1641; G09G 2300/0426; G09G 3/3225; G09G 2310/0202; G09G 5/003;
(Continued)

(56) References Cited

U.S. PATENT DOCUMENTS

2011/0007042 A1   1/2011  Miyaguchi
2014/0217373 A1*  8/2014  Youn ................... H01L 23/4985
                                                          257/40

FOREIGN PATENT DOCUMENTS

JP         2014-206760 A    10/2014

* cited by examiner

*Primary Examiner* — Thoi V Duong
(74) *Attorney, Agent, or Firm* — Michael Best & Friedrich LLP

(57) ABSTRACT

A display device includes a first substrate having flexibility, a second substrate having flexibility, and a sealant adhering together the first substrate and the second substrate, wherein the sealant includes a curved section on an inner side in a planar view, the first substrate includes a first region not corresponding to the curved section and a second region corresponding to the curved section, and also a signal line from the first region to the second region, and a second angle formed by an extending direction of the signal line and a curved axis direction of the curved section in the second region is smaller than a first angle formed by an extending direction of the signal line and the curved axis direction in the first region.

19 Claims, 19 Drawing Sheets

(51) Int. Cl.
*G02F 1/1362* (2006.01)
*G02F 1/1339* (2006.01)
G02F 1/1335 (2006.01)
G02F 1/1345 (2006.01)

(52) U.S. Cl.
CPC ...... *G02F 1/1345* (2013.01); *G02F 1/133305* (2013.01); *G02F 1/133512* (2013.01); *G02F 2001/133388* (2013.01); *G02F 2201/123* (2013.01)

(58) Field of Classification Search
CPC .... H05K 1/028; H05K 1/0281; H05K 1/0393; H05K 1/118; H05K 5/0017; H05K 2201/05; H05K 2201/10106; H05K 3/361
See application file for complete search history.

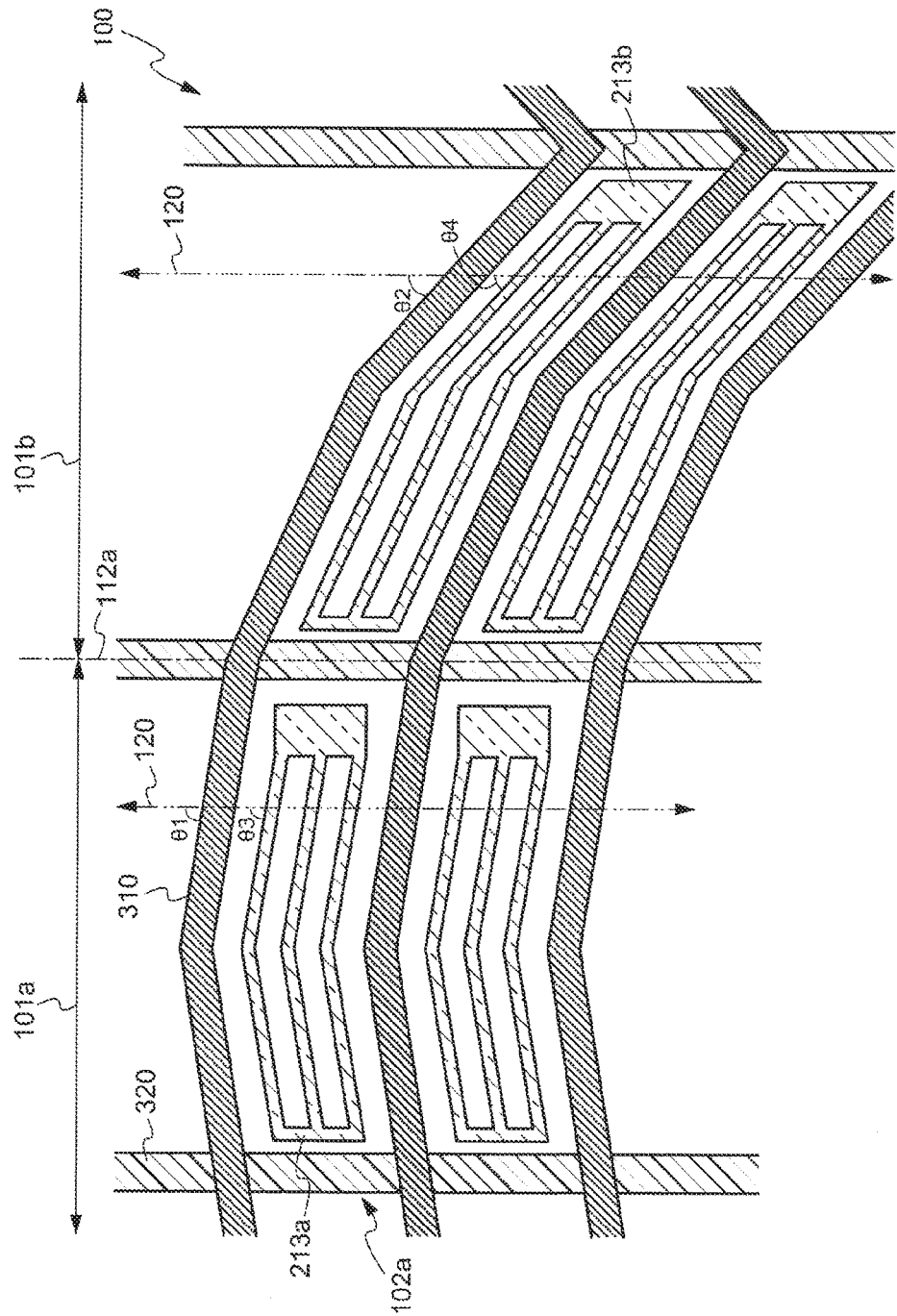

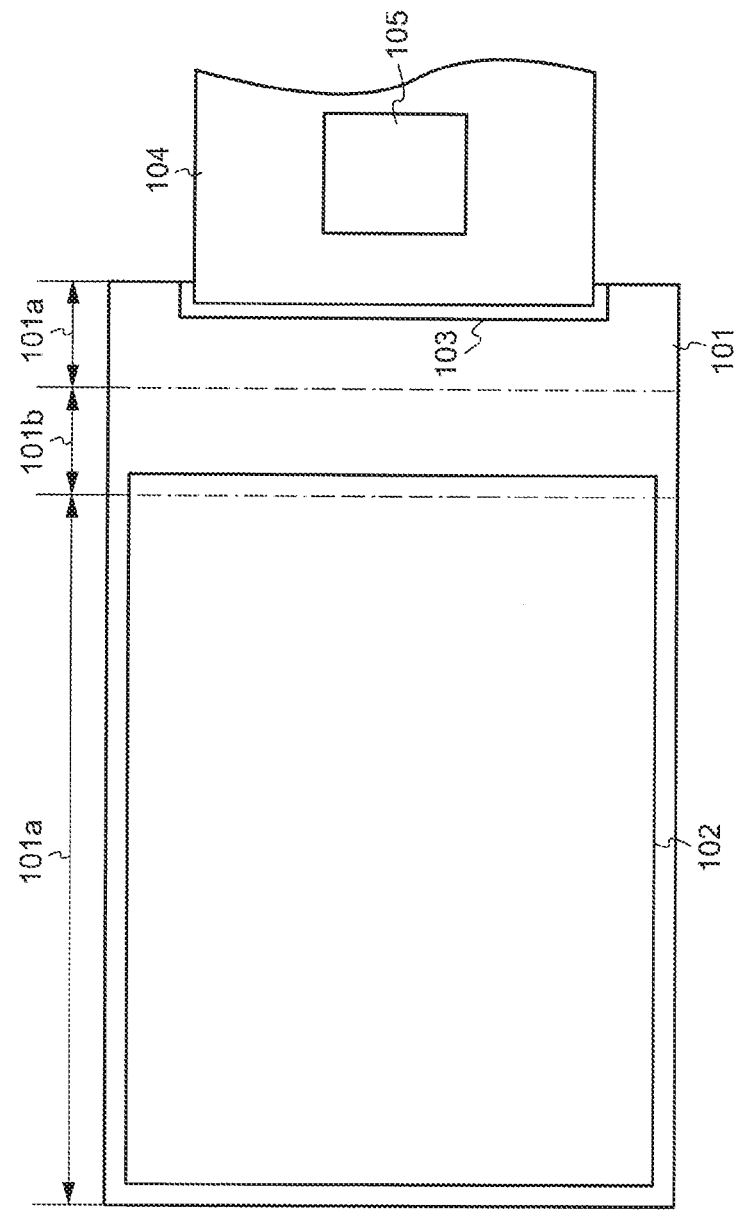

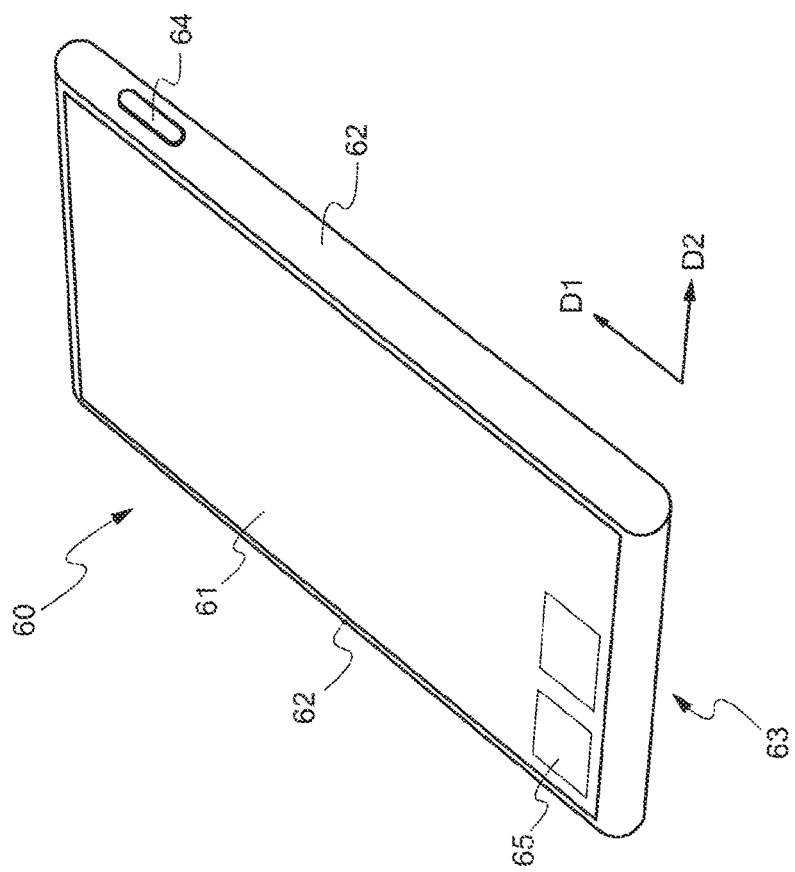

DISPLAY DEVICE

CROSS REFERENCE TO RELATED APPLICATIONS

This application is based on and claims the benefit of priority from the prior Japanese Patent Application No. 2017-031993, filed on 23 Feb. 2017, the entire contents of which are incorporated herein by reference.

FIELD

The present invention is related to a display device including a plurality of pixels. In particular, the present invention is related to a display device using a substrate having flexibility as a support substrate.

BACKGROUND

Conventionally, a display device using a substrate having flexibility (hereinafter referred to as [flexible substrate]) is known as a support substrate of a display device. A display device using a flexible substrate has flexibility and is bendable as a whole ad therefore has a feature of high versatility with respect to the environment in which it is used.

In addition, in the case when a flexible substrate is used, there is an advantage that a bezel part of the display device (the edge parts other than the display screen viewed from the observer) can be reduced. For example, Japanese Laid Open Patent Application Publication No. 2014-206760 discloses a display device in which a driver circuit part can be arranged on the rear side of a display region by curved and curved a substrate in a wiring part which connects the display region and driver circuit part.

SUMMARY

A display device according to one embodiment of the present invention includes a first substrate having flexibility, a second substrate having flexibility, and a sealant adhering together the first substrate and the second substrate, wherein the sealant includes a curved section on an inner side in a planar view, the first substrate includes a first region not corresponding to the curved section and a second region corresponding to the curved section, and also a signal line from the first region to the second region, and a second angle formed by an extending direction of the signal line and a curved axis direction of the curved section in the second region is smaller than a first angle formed by an extending direction of the signal line and the curved axis direction in the first region.

BRIEF DESCRIPTION OF DRAWINGS

FIG. 4B is a planar view diagram schematically showing a part of an array substrate in a display device of a first embodiment;

FIG. 5 is a planar view diagram schematically showing an array substrate in a display device of a first embodiment;

FIG. 18 is a perspective view diagram showing an example of an electronic device of a ninth embodiment.

DESCRIPTION OF EMBODIMENTS

Figure 1:
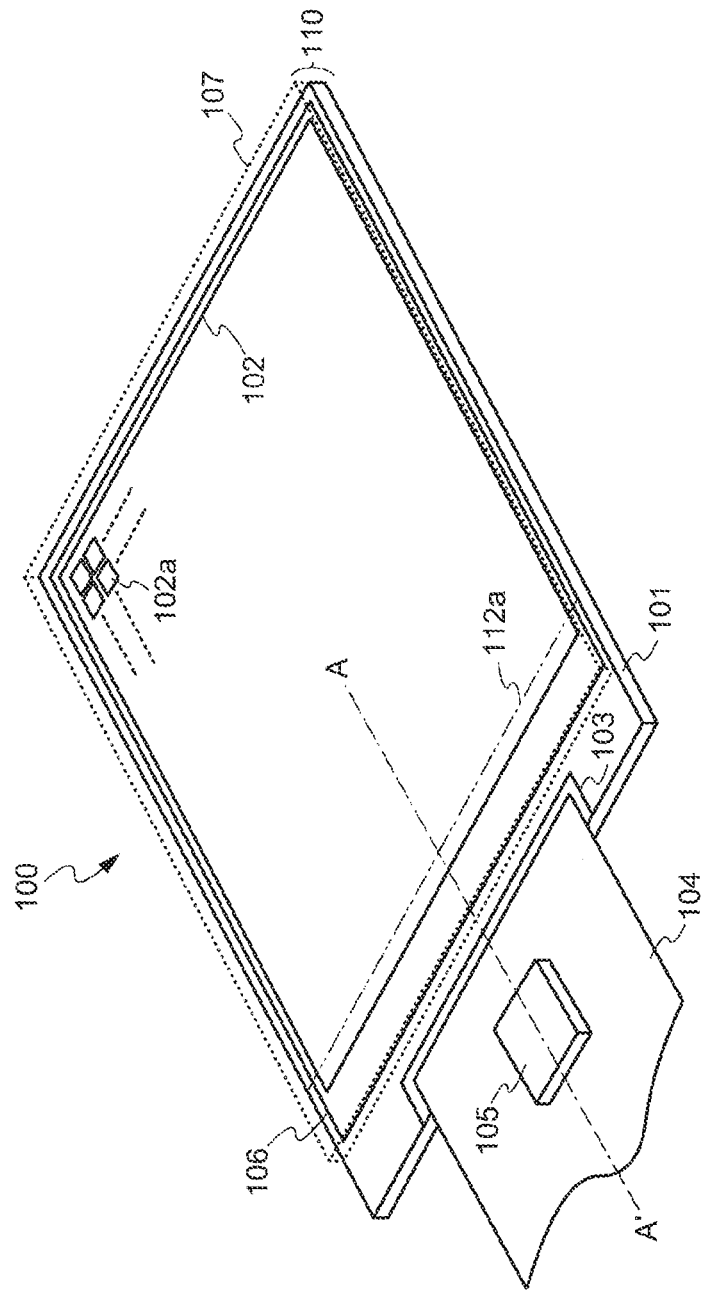
FIG. 1 is a perspective view diagram showing a schematic structure of a display device in a first embodiment.

In the display device described in Japanese Laid Open Patent Application Publication No. 2014-206760, since a substrate curved between a display region and a drive circuit part, the curvature of the curved section of the substrate becomes very large. In the curved section, a plurality of wirings connecting the display region and the drive circuit part arranged so as to be orthogonal to a curved axis direction. Therefore, the plurality of wirings arranged in the curved section also curve at a very large curvature. As a result, in the curved section, wiring may be damaged by curvature and disconnection may occur.

An object of the present invention is to reduce damage of wirings in a bent portion in a display device using a flexible substrate.

In the following, each embodiment of the present invention is described with reference to the drawings and so forth. However, the present invention can be implemented in various modes in a range not deviating from the gist of the invention, and should not be construed as being limited to the description of the embodiments illustrated below. Also, regarding the drawings, for more clarification of description, the width, thickness, shape, and so forth of each part or unit may be schematically represented, compared with actual modes. However, these schematic drawings are depicted by way of example and do not limit the interpretation of the present invention. Furthermore, in the specification and each drawing, a component including a function similar to that of a component in a drawing already described is provided with a reference character identical to that of the already-described component, and redundant description may be omitted.

Note in the specification and claims that expressions such as "above" and "below" for description of the drawings represent relative positional relations between a target structure and another structure. Specifically, when viewed from a side surface, a direction from a first substrate (array substrate) toward a second substrate (counter substrate) is defined as "above", and a direction opposite thereto is defined as "below".

Also, "inside" and "outside" represent relative positional relations of two areas with reference to a display section. That is, "inside" indicates a side relatively near the display section with respect to one area, and "outside" indicates a side relatively far from the display section with respect to one area. However, the definitions of "inside" and "outside" herein are assumed to be in a state in which the display panel is not bent.

Also in the specification, expressions such as "a includes A, B, or C", "a includes any of A, B, and C", and "a includes one selected from a group comprising A, B, and C" do not preclude a case in which a includes a plurality of combinations of A to C unless otherwise specified. Furthermore, these expressions do not preclude a case in which a includes another component.

A "display device" refers to a structure which displays video using an electrooptic layer. For example, the term "display device" may indicate a display cell including an electrooptic layer or may indicate a structure having another optical member (for example, a polarizing member, backlight, cover member, touch panel, or the like) attached to a display cell. Here, the "electrooptic layer" can include a liquid-crystal layer, electroluminescence (EL) layer, electrochromic (EC) layer, or electrophoretic layer unless a technical contradiction arises. Therefore, while a liquid-crystal display device including a liquid-crystal layer is illustrated and described as a display device in the embodiments described below, this is not meant to preclude application to a display device including any of the other electrooptic layers described above.

(First Embodiment)
<Structure of Display Device>

First, a schematic configuration of a liquid-crystal display panel as an example of a display panel 100 of a first embodiment is described. FIG. 1 is a perspective view of a schematic configuration of the display device 100 in the first embodiment.

The display panel 100 has an array substrate 101, a display section 102, a terminal section 103, a flexible printed circuit board 104, a drive circuit 105, a sealant 106, adhesive section 107 and a counter substrate 108. For simplification of description, optical members such as a polarizing member and a backlight are omitted in FIG. 1. These optical members will be described further below.

The array substrate 101 is a substrate having a thin-film transistor and a plurality of pixels 102a including pixel electrodes connected to the thin-film transistor provided on a substrate with flexibility (for example, a resin substrate). The display section 102 is a region configured with the plurality of pixels 102a arrayed in a row direction and a column direction.

Each pixel 102a includes a circuit using a thin-film transistor as a switching element. By controlling ON/OFF operation of the switching element in response to a supplied video signal, each pixel 102a performs orientation control over liquid-crystal molecules corresponding to a pixel electrode included in the pixel 102a. That is, the above-described display section 102 refers to a region including the thin-film transistor and a pixel to which a video signal is supplied via the thin-film transistor (the pixel may be hereinafter referred to as a "first pixel").

Figure 2:
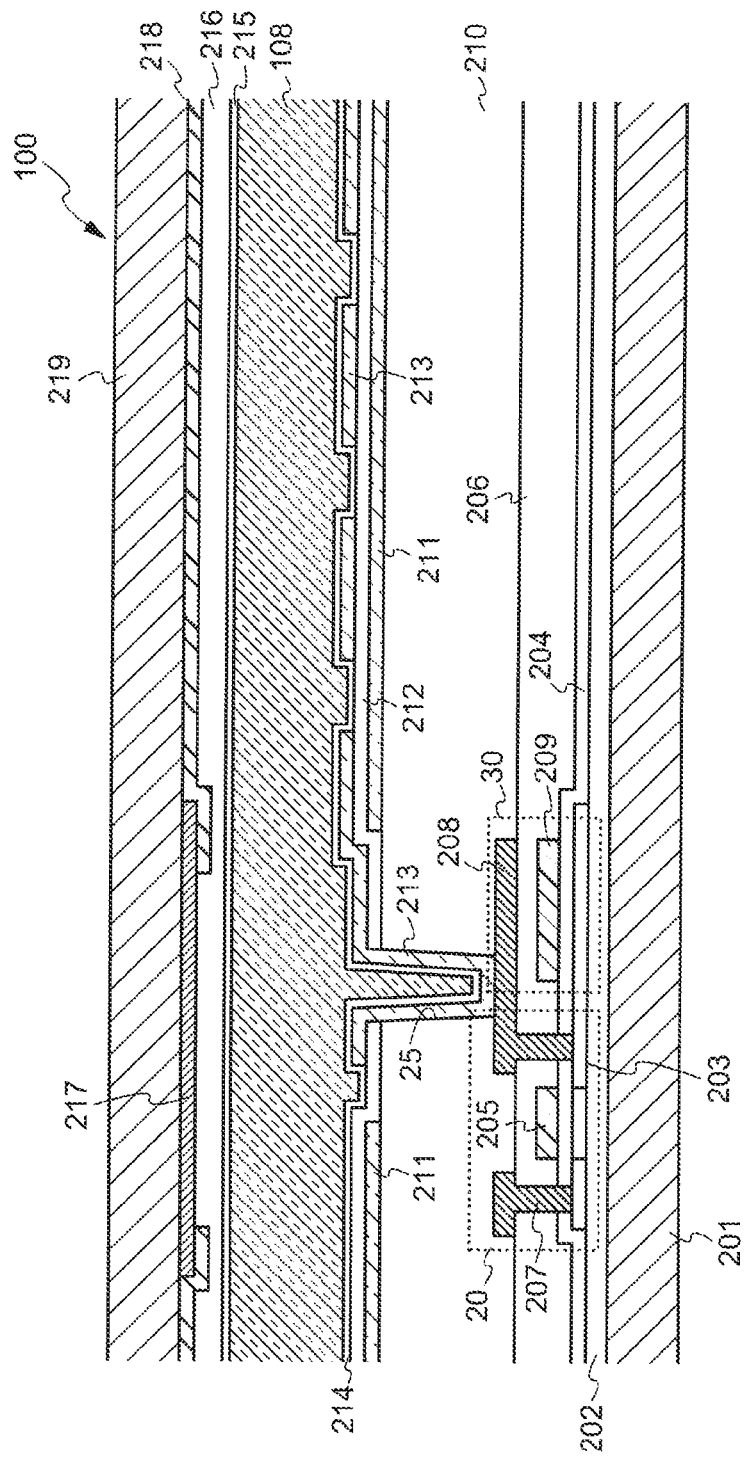
FIG. 2 is a cross-sectional diagram showing a structure of a pixel structure in a display device in a first embodiment.

Here, the pixel 102a as a first pixel is briefly described. FIG. 2 is a sectional view depicting the configuration of a pixel structure of the display device 100 in the first embodiment.

In FIG. 2, on a front surface of the resin substrate configured of a resin material such as polyimide, an undercoat layer 202 configured of an inorganic insulating material is provided. Above the undercoat layer 202, a thin-film transistor 20 and a retention capacitor 30 are provided.

The thin-film transistor 20 includes a semiconductor layer 203, a gate insulating layer 204, a gate electrode 205, an insulating layer 206, a source electrode 207, and a drain electrode 208. These components can be configured of known materials. The source electrode 207 is connected to a video signal line 310 (FIG. 4A) described later. The video signal line 310 is connected to the source electrode 207 of each thin film transistor 20 arranged in the column direction and extends from the display section 102 to the terminal section 103.

The retention capacitor 30 includes the semiconductor layer 203, the gate insulating layer 204, a capacitive electrode 209, the insulating layer 206, and the drain electrode 208. Here, the semiconductor layer 203, the gate insulating layer 204, and the capacitive electrode 209 configure a first retention capacitor, and the capacitive electrode 209, the insulating layer 206, and the drain electrode 208 configure a second retention capacitor. The retention capacitor 30 has a total capacitance of these first retention capacitor and second retention capacitor. Note that the display device 100 does not have to include the capacitance electrode 209.

Above the thin-film transistor 20 and the retention capacitor 30, a resin layer 210 configured of a resin material such as acrylic is provided, planarizing undulations due to the thin-film transistor 20 and the retention capacitor 30. Above the resin layer 210, a common electrode 211 configured of a transparent conductive film made of ITO (Indium Tin Oxide) or the like is provided. Above the common electrode 211, a pixel electrode 213 is provided via an insulating layer 212.

As the insulating layer 212, an inorganic insulating film such as, for example, a silicon oxide film or silicon nitride film can be used, although not limited thereto. Also, as with the common electrode 211, the pixel electrode 213 is configured of a transparent conductive film made of ITO or the like. The pixel electrode 213 is electrically connected to the drain electrode 208 via a contact hole 25 provided in the resin layer 210 and the insulating layer 212.

While it seems that a plurality of pixel electrodes 213 are provided in FIG. 2, the pixel electrode 213 in a planar view has, in practice, a pattern shape including a linear portion extending in a predetermined direction. That is, the pixel electrode 213 in the planar view has a shape with a plurality of adjacently-arranged linear electrodes connected at one end. In this specification, a portion of the pixel electrode 213 corresponding to a linear electrode is referred to as an electrode portion.

In the present embodiment, an electric field (horizontal electric field) is formed between the common electrode 211 and the pixel electrode 213. A mode using a horizontal electric field as described above is referred to as an IPS (In-Plain Switching) mode. Also in the IPS mode, as in the present embodiment, a mode using a horizontal electric field when the common electrode 211 and the pixel electrode 213 are arranged so as to overlap (in this case, the horizontal electric field is referred to as a fringe electric field) is referred to as FFS (Fringe Field Switching) mode.

However, any other liquid-crystal display mode may be used. For example, a mode using a horizontal electric field formed by using a pixel electrode and a common electrode provided in the same layer may be used. Also, VA (Vertical Alignment) mode may be used, in which a vertical electric field is formed between a pixel electrode provided on an array substrate side and a common electrode provided on a counter electrode side to control liquid-crystal orientation in that vertical electric field.

Above the pixel electrode 213, an alignment film 214 is provided. In the present embodiment, components from the resin substrate 201 to the alignment film 214 are collectively referred to as the array substrate 101. To the pixel electrode 213, a video signal is supplied via the thin-film transistor 20. The video signal is supplied to the source electrode 207 of the thin-film transistor 20, and is transmitted to the drain electrode 208 by the control of the gate electrode 205. As a result, the video signal is supplied from the drain electrode 208 to the pixel electrode 213.

Above the alignment film 214, a liquid-crystal layer 108 is retained. As described above, the liquid-crystal layer 108 is retained by being surrounded by a sealant 106 between the array substrate 101 and the counter substrate 107.

Above the liquid-crystal layer 108, an alignment film 215 on a counter substrate 107 side is provided. Above the alignment film 215, an overcoat layer 216 is provided. The overcoat layer 216 planarizes undulations due to a light-shielding member 217 configured of a resin material containing a black pigment or black metal material and a color filter member 218 configured of a resin material containing a pigment or dye corresponding to each color of RGB.

Above the light-shielding member 217 and the color filter member 218, a resin substrate 219 configured of a resin material such as polyimide is arranged. In practice, the light-shielding member 217, the color filter member 218, the overcoat layer 216, and the alignment film 215 are laminated above one surface of the resin substrate 219 to configure the counter substrate 107. When the moisture permeability of the resin substrate 219 is high, for improvement in resistance to water, an inorganic insulating film made of silicon nitride, silicon oxide, or the like may be formed between the resin substrate 219 and the color filter member 218.

As described above, the display section 102 of the present embodiment has the plurality of pixels 102a having the structure described by using FIG. 2.

With reference to FIG. 1 again, the terminal section 103 is a terminal which supplies an external video signal or the like to the display section 102. Specifically, the terminal section 103 is configured with wirings connected to the respective pixels 102a integrated together.

The flexible printed circuit board 104 is electrically connected to the terminal section 103 to supply an external video signal, drive signal, and so forth. The flexible printed circuit board 104 is configured with a plurality of wirings arranged on a resin film, and is bonded to the terminal section 103 via an anisotropic conductive film or the like. The flexible printed circuit board 104 is provided with the drive circuit 105 configured of an IC chip.

The drive circuit 105 supplies the display section 102 with a video signal to be supplied to the pixel electrode of each pixel 102a and a drive signal for controlling the thin-film transistor of each pixel 102a. In FIG. 1, an example is depicted in which the drive circuit 105 configured of an IC chip for controlling the thin-film transistor configuring each pixel 102a is provided to the flexible printed circuit board 104. However, a drive circuit such as a gate driver circuit or a source driver circuit can be provided around the display section 102 by using a thin-film transistor. Also, the drive circuit 105 configured of an IC chip can be provided on the array substrate 101 outside the sealant 106 in COG (Chip On Glass) mode.

The sealant 106 bonds the array substrate 101 and the counter substrate 107 together, and retains the liquid-crystal layer 109 (refer to FIG. 2) between the array substrate 101 and the counter substrate 107. For simplification of the drawing, the counter substrate 107 is indicated by dotted lines in FIG. 1. Also, although not depicted in FIG. 1, the counter substrate 107 includes a light-shielding member and a color filter member. A structure including the array substrate 101, the sealant 106, the counter substrate 107, and the liquid-crystal layer 108 is hereinafter referred to as a liquid-crystal cell 110.

In FIG. 1, a two-dot-chain line indicates a bending position 112a of the liquid-crystal cell 110 described later. In FIG. 1, the bending position 112a of the liquid-crystal cell 110 is inside the sealant 106. That is, as will be described later, the display device 100 of the present embodiment has a structure in which a bent portion is present inside the sealant 106.

Figure 3:
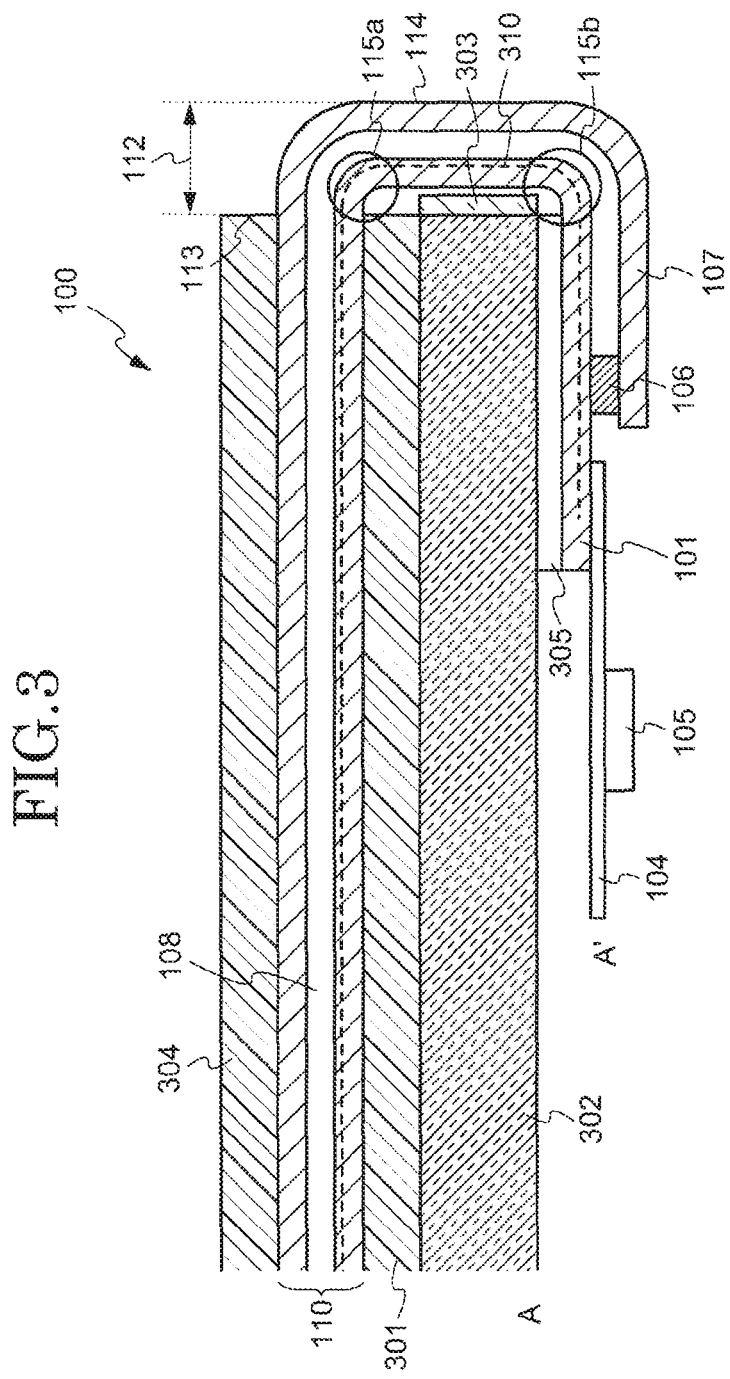
FIG. 3 is a diagram showing a cross-sectional structure in a display device of a first embodiment.

FIG. 3 is a diagram depicting a sectional configuration of the display device 100 of the first embodiment. Specifically, FIG. 3 depicts a state of the display device 100 depicted in FIG. 1 as being cut along a one-dot-chain line A-A' and partially bent.

As is shown In FIG. 3, of two surfaces of the array substrate 101, a surface opposing (facing) the counter substrate 107 is defined as a front surface, and a surface opposite to the front surface is defined as a back surface. Similarly, of two surfaces of the counter substrate 107, a surface opposing (facing) the array substrate 101 is defined as a front surface, and a surface opposite to the front surface is defined as a back surface. Therefore, the liquid-crystal layer 108 is retained as interposed between the front surface of the array substrate 101 and the front surface of the counter substrate 107 inside the sealant 106.

As described above, in the display device 100 of the present embodiment, a substrate with flexibility (for example, a resin substrate) is used as a support substrate of the array substrate 101. Thus, the array substrate 101 has flexibility as a whole. Similarly, a substrate with flexibility is used as a support substrate of the counter substrate 107, and thus the counter substrate 107 also has flexibility as a whole. Therefore, the display device 100 of the present embodiment can be bent so that the flexible printed circuit board 104 is arranged on the back surface side of the liquid-crystal cell 110, as depicted in FIG. 3. That is, the display section 102 and the terminal section 103 overlap each other in a plan view.

In the display device 100 of the present embodiment, a polarizing member 301, a light-guiding member 302, and a light source 303 are arranged on the back surface side of the array substrate 101 so as to be overlapped on the display section 102. Here, the polarizing member 301 and the light-guiding member 302 are configured as interposed on the back surface side of the array substrate 101. Specifically, the polarizing member 301 and the light-guiding member 302 are interposed between a portion of the back surface of the array substrate 101 inside a curved section 112, which will be described further below, and a portion thereof outside the curved section 112. Also, the light source 303 is arranged on a side surface of the light-guiding member 302 so as to oppose the curved section 112, which will be described further below. As the light source 303, for example, an LED light source can be used. Light-guiding member 302 and light source 303 configure an illuminating device (backlight).

On the back surface side of the counter substrate 107, the polarizing member 304 is arranged. With this, light emitted from the light source 303 is guided by the light-guiding member 302 to the polarizing member 301, and is recognized by an observer via the liquid-crystal cell 110 and the polarizing member 304. In the specification and claims, an optically acting member such as a polarizing member, a light-guiding member, or a light source may be referred to as an "optical member".

Here, the example is described in which a polarizing member and an illuminating device are provided as members other than the liquid-crystal cell 110. In another example, another optical member (such as a retardation plate or antireflection plate) or a touch panel may further be provided. For these optical member and touch panel, a known member or a known structure can be used.

In the present embodiment, an insulating layer 305 is provided as a cushioning member in order to avoid a contact between the back surface of the array substrate 101 and the light-guiding member 302. As the insulating layer 305, for example, a resin layer can be used. As a matter of course, the insulating layer 305 can be omitted. Also, when the drive circuit 105 is provided on the array substrate 101 in COG mode, the configuration may be such that the drive circuit 105 is covered with the insulating layer 305 for protection.

Here, in the display device 100 of the present embodiment, a portion bent as being folded is referred to as a "curved section". As shown in FIG. 3, the display device 100 has the curved section 112 inside the sealant 106 in a planar view. Also in a planar view, the display device 100 is bent so that the portion of the back surface of the array substrate 101 inside the curved section 112 and the portion thereof outside the curved section 112 are overlapped each other.

In addition, while the array substrate 101 located at the curved section 112 is bent in a shape close to a substantially right angle in FIG. 3, the shape is not limited to this shape. That is, the shape of the curved section 112 appropriately varies according to the thickness of the light guide member 302 and/or the size of the space where the display device 100 is arranged. For example, if there is a margin in the space where the display device 100 is arranged, the curved section 112 may have a curved shape as a whole.

Also in the present embodiment, the configuration is such that a portion of the liquid-crystal cell 110 not overlapped on the polarizing member 301 and the polarizing member 304 is bent. Thus, as depicted in FIG. 3, the curved section 112 in the display device 100 of the present embodiment slightly projects from an edge 113 of the polarizing member 304 in a planar view. Here, in a planar view, an end of the curved section 112 visually recognizable by the observer is defined as a "virtual end". That is, the curved section 112 can also be said as indicating a portion positioned in a range from the edge 113 of the polarizing member 304 to a virtual end 114.

Thus, in the display device 100 depicted in FIG. 3, a region where the observer can visually recognize video (a displayable region) can be substantially regarded as a region where the polarizing member 301 and polarizing member 304 are arranged. Therefore, by fully utilizing the region where the polarizing member 301 and polarizing member 304 are arranged, the displayable region can be increased to maximum.

Here, as is shown in FIG. 3, an image signal line 310 (broken line shown inside the array substrate 101) for transmitting image signals to the thin film transistor 20 of each pixel 102a extends from the display section 102 (FIG. 1) to the terminal section 103 (FIG. 1). That is, the image signal line 310 passes through the curved section 112.

Therefore, in the parts 115a and 115b having a larger curvature than the other parts of the curved section 112, there is a possibility that a large stress acts on the image signal line 310.

As a result, in the display device 100 of the present embodiment, the image signal line 310 located in the curved section 112 is arranged intentionally tilted with respect to the curved axis (rotation axis when the display device 100 is curved). In this way, the display device 100 realizes a structure which relieves stress acting on the image signal line 310. This point is explained in detail below.

Figure 4A:
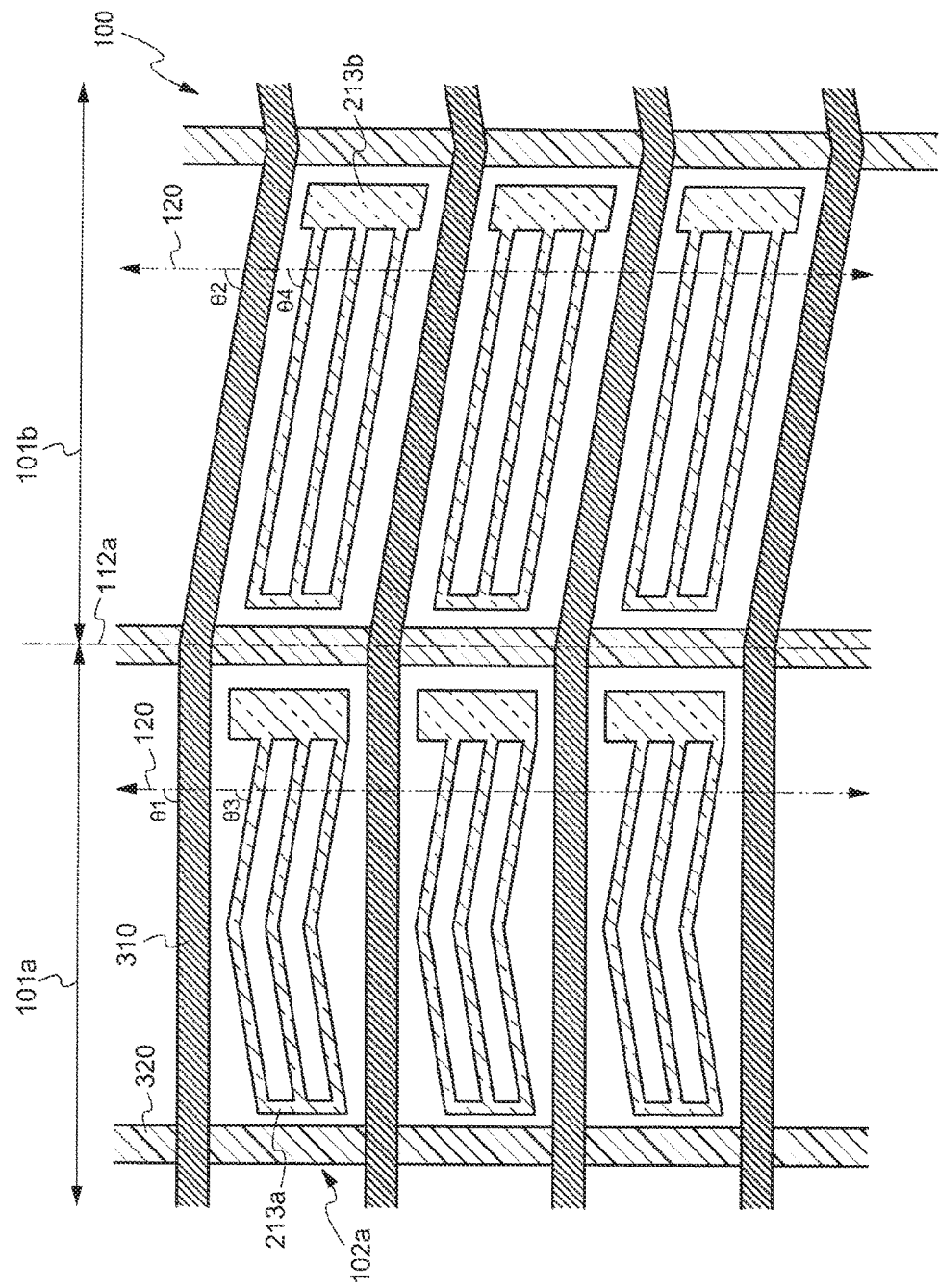
FIG. 4A is a planar view diagram schematically showing a part of an array substrate in a display device of a first embodiment.

FIG. 4A is a planar view diagram schematically showing a part of the array substrate 101 in the display device 100 of the first embodiment. Specifically, FIG. 4A shows an enlarged appearance of the vicinity of the bending position 112a shown in FIG. 1. However, for the convenience of explanation, only six pixels are shown. FIG. 5 is a planar view diagram schematically showing the array substrate 101 in the display device 100 of the first embodiment. Although not shown in FIG. 4A, a common electrode 211 is arranged across a plurality of pixels 102a between a resin layer 210 (FIG. 2) and a pixel electrode 213.

As is shown in FIG. 5, in the present embodiment, a region of the array substrate 101 which does not include the curved section 112, that is, a region which does not correspond to the curved section 112 is referred to as the "first region 101a". In addition, a region of the array substrate 101 which includes the curved section 112, that is, a region which corresponds to the curved section 112 is referred to as the "second region 101b". As described above, the bending position 112a is a position corresponding to the edges of the polarization member 301 and the polarization member 304 in a planar view. As a result, the first region 101a may be regarded as overlapping with the polarization members 301 and 304 in a planar view of the array substrate 101. Reversely, the second region 101b may be regarded as a region of the array substrate 101 which does not overlap with the polarization members 301 and 304 in a planar view.

Furthermore, in the array substrate 101, a region further to the outer side than the curved section 112, that is, a region curved on the rear surface side of a liquid crystal cell 110 is also included in the first region 101a. Therefore, in the case when the array substrate 101 is not curved, as is shown in FIG. 5, the second region 101b corresponding to the curved section 112 is arranged at a position sandwiched between the first regions 101a which do not correspond to the curved section 112. Furthermore, in FIG. 5, the region where a terminal section 103 is formed is not the first region 101a but may also be the second region 101b. In addition, the region where the terminal section 103 is formed may also be a region different from the first region 101a and the second region 101b.

Here, in FIG. 4A, the array substrate 101 is curved along the bending position 112a. As a result, the direction parallel to the bending position 112a is the curved axis direction 120. The plurality of image signal lines 310 extend from the first region 101a to the second region 101b. In addition, the plurality of scanning signal lines 320 extend along a direction roughly parallel to the curved axis direction 120. Below, the direction in which a signal line such as the image signal line 310 or the scanning signal line 320 extends is referred to as the "extending direction".

The pixel electrode 213 is arranged in a region surrounded by two adjacent image signal lines 310 and two adjacent scanning signal lines 320. In FIG. 4A, a pixel electrode 213a including an electrode section having a curved section is arranged in the pixel 102a of the first region 101a. In the first region 101a, an example is shown in which the pixel 102a is driven by a multi-domain method using such a pixel electrode 213a. On the other hand, a pixel electrode 213b having a linear shaped electrode section not having a curved section is arranged in the pixel 102a of the second region 101b. In this way, in the case when the second region 101b is not used as a display region, the interval between the image signal line 310 and the electrode section of the pixel electrode 213b may be set constant. Although an example in which the scanning signal line 320 is also arranged in the second region 101b is shown in FIG. 4A, the scanning signal line 320 in the second region 101b may be omitted.

At this time, in the display device 100 of the present embodiment, in the first region 101a, the image signal line 310 is arranged along a direction roughly orthogonal to the curved axis direction 120. On the other hand, in the second region 101b, the image signal line 310 is arranged along a direction which intersects obliquely the curved axis direction 120. That is, compared to a first angle (θ1) formed by the extending direction of the image signal line 310 in the first region 101a and the curved axis direction 120 of the curved section 112, a second angle (θ2) formed by the extending direction of the image signal line 310 in the second region 101b and the curved axis direction 120 of the curved section 112 is small.

In addition, compared to a third angle (θ3) formed by the extending direction of the electrode section of the pixel electrode 213a in the first region 101a and the curved axis direction 120 of the curved section 112, a fourth angle (θ4) formed by the extending direction of the electrode section of the pixel electrode 213 in the second region 101b and the curved axis direction 120 of the curved section 112 may be reduced.

Furthermore, in FIG. 4A, the first angle (θ1) and the third angle (θ3) in the first region 101a are different from each other. However, as is shown in FIG. 4B, in order to form a uniform electric field in the pixel 102a, the image signal line 310 may be curved according to the curvature of the electrode section of the pixel electrode 213a (however, for convenience of explanation, only four pixels are shown). That is, the image signal line 310 may be curved so that the first angle (θ1) and the third angle (θ3) are the same angle. In this case, the image signal line 310 bends further at the bending position 112a. Therefore, as is shown in FIG. 4B, the second angle (θ2) is smaller than the first angle (θ1). In addition, since the electrode section of the pixel electrode 213b also bends according to the image signal line 310, the fourth angle (θ4) is smaller than the third angle (θ3).

As described above, in the present embodiment, the extending direction of the image signal line 310 changes at the boundary between the first region 101a and the second region 101b. That is, the angle of the image signal line 310 with respect to the curved axis direction 120 changes. Specifically, the image signal line 310 located in the second region 101b inclines more greatly with respect to the curved axis direction 120 than the image signal line 310 located in the first region 101a. In this way, stress acting on the image signal line 310 at the curved section 112 is reduced and it is possible to reduce damage to the image signal line 310 at the curved section 112.

In FIG. 4A and FIG. 4B a structure is shown which matches the boundary between the first region 101a and the second region 101b (that is, the bending position 112a) is a position where the angle of the image signal line 310 with respect to the curved axis direction 120 changes from θ1 to θ2 (referred to as "angle changing position" below). However, actually, it is desirable to take into consideration the position misalignment at the time of bonding the polarization member 304. Even when the position of the edge 113 of the polarization member 304 is designed so as to match with the angle changing position described above, the position of the polarization member 304 may sometimes be displaced.

Figure 6:
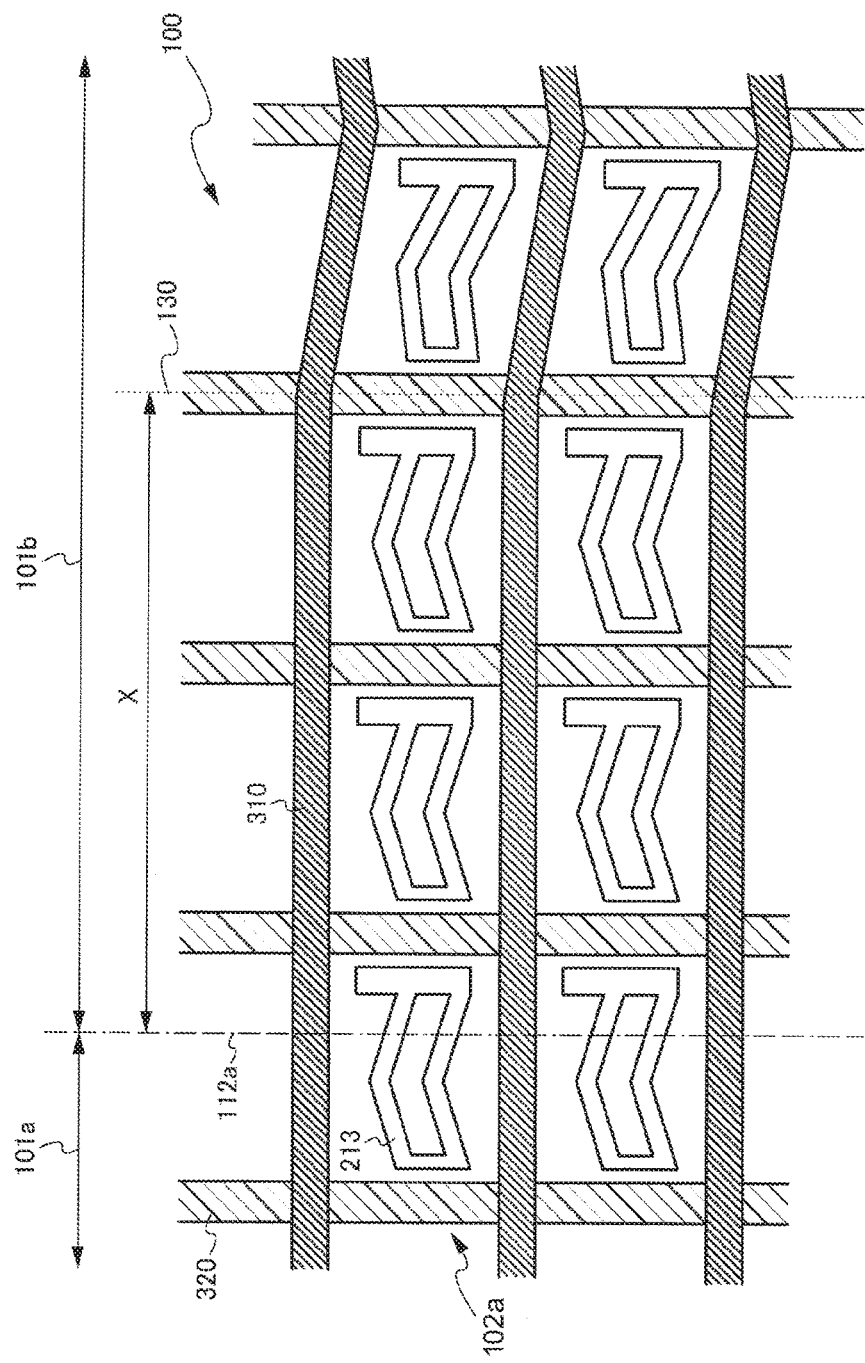
FIG. 6 is a diagram for explaining the case where misalignment occurs when bonding a polarization member.

For example, in the case when position misalignment occurs when the polarization member 304 is bonded, the position of the edge 113 of the polarization member 304 (that is, the bending position 112a) is located further inside (display section side) than the positions shown in FIG. 4A and FIG. 4B. This state is shown in FIG. 6. FIG. 6 is a diagram for explaining a case where position misalignment occurs when the polarization member 304 is bonded. As is shown in FIG. 6, when position misalignment of the polarization member 304 occurs, a distance represented by X is generated between the angle changing position 130 and the bending position 112a. In other words, in the second region 101b, there may be a part where the curved axis direction 120 and the image signal line 310 are roughly orthogonal to each other by the length of the distance X.

Figure 7:
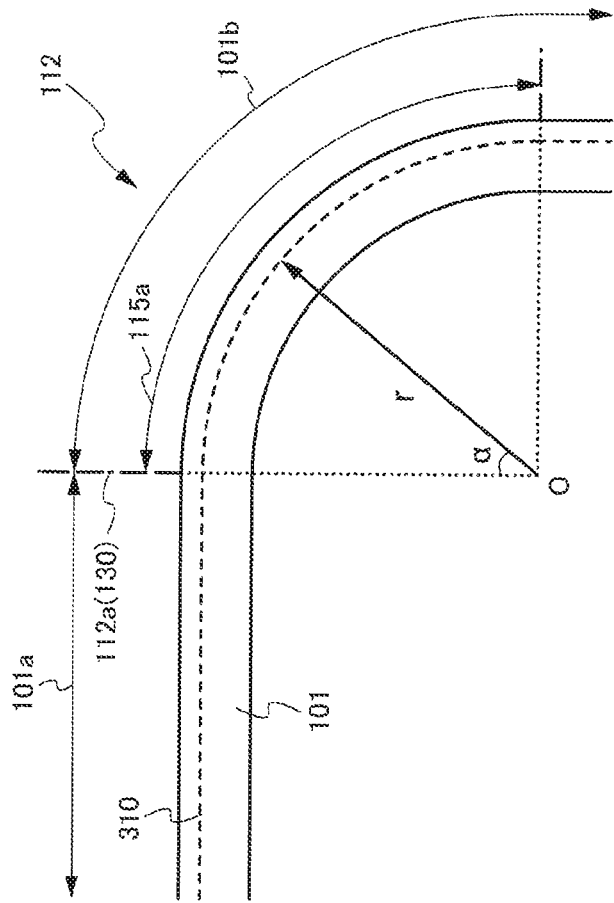
FIG. 7 is a planar view diagram schematically showing an expanded view of the vicinity of a curved section in a first embodiment.

Here, the possible range of the distance X described above is explained using FIG. 7. FIG. 7 is a planar view diagram schematically showing an expanded view of the vicinity of the curved section 112 in the first embodiment. In FIG. 7, the array substrate 101 forms a curved section 112 starting from the bending position 112a. Although not shown in the diagram, the edge 113 of the polarization member 304 is positioned at the angle changing position 130. Therefore, the bending position 112a matches the angle changing position 130. The array substrate 101 is curved downwards at the bending position 112a. FIG. 7 shows a state in which the array substrate 101 is curved by the curvature radius r. The part curving at the curvature radius r corresponds to the "part 115a having a larger curvature than other parts" shown in FIG. 3. Here, it is assumed that the curvature radius r is constant.

As described above, since the stress acting on the image signal line 310 increases in the part 115a, it is preferred that the extending direction of the image signal line 310 is not perpendicular to the curved axis direction 120. For this reason, the display device 100 of the present embodiment is designed so that the angle changing position 130 and the starting position of the "part 115a" match.

Generally, when a certain member is curved, the elongation at an arbitrary position in that member is proportional to the sine of the angle from the position at which curved begins. For example, as shown in FIG. 7, when an angle formed by a line segment connecting a start point O and an arbitrary position of the image signal line 310 and a line segment connecting the start point O and the curved position 112a is given as a, the elongation of the image signal line 310 is proportional to sin (α). In the case of the structure shown in FIG. 7, the minimum (sin(0)=0) is when the image signal line 310 is at the bending position 112a (that is, when α=0), and maximum (sin(90)=1) is when the image signal line 310 is at the position where α=90. Furthermore, the position where α=90 corresponds to a virtual end part 114 shown in FIG. 3.

At this time, in order to reduce the stress acting on the image signal line 310 to a level at which there is no problem, it is preferred that the elongation of the image signal line 310 is set to ½ or less (preferably ¼ or less) of the maximum value. That is, the elongation of the image signal line 310 is allowable as long as the angle α described above is within a range that 30 degrees or less (preferably, 14.5 degrees or less). Here, when α=30 degrees, the distance A from the bending position 112a can be obtained by calculating A=2πr×30/360. In addition, when α=14.5 degrees, the distance A' from the bending position 112a can be obtained by calculating A'=2πr×14.5/360. For example, in the case when the curvature radius is r=0.5 mm, the distance A is about 262 μm and the distance A' is about 126 μm.

From the above, if the distance X from the position of the edge 113 of the polarization member 304 is within the range of A or less described above (preferably A' or less), it can be said that the stress acting on the image signal line 310 is small even the inside of the curved section 112 (in particular, the inside of the part 115a). Therefore, in the display device 100 according to the present embodiment, the distance X between the bending position 112a and the angle changing position 130 is set to A (=2πr×30/360) or less and preferably A' (=2πr×14.5/360) or less.

Furthermore, there is a danger that display quality may deteriorate if the electrode section of the pixel electrode 213 or the image signal line 310 is curved excessively. Therefore, in order to prevent the pixel structure having curved image signal line 310 from being positioned in the display section 102, it is preferred that to design and arrange more pixel structures further to the outside than the curved position where the image signal line 310 does not curve by the range where the position misalignment of the polarization member 304 is expected, that is, by the width of the distance X described above.

From a different viewpoint, no problem occurs if the polarization member 304 is misaligned on the inner side (display section side) as long as it is within the range of the distance X from the position of the edge 113 of the polarization member 304. In this case, in the display device 100 of the present embodiment, the angle formed by the extending direction of the image signal line 310 and the curved axis direction 120 at the starting position of the curved section 112 (starting position of the second region 101b) becomes the first angle (θ1) shown in FIG. 4A.

The extent to which the distance X is set may be appropriately determined while considering parameters such as the curvature radius r of the curved section 112, the bonding accuracy of the polarization member 304 and the pixel size. For example, if the bonding accuracy is about 200 μm and the curvature radius is 0.5 mm, the distance X at which stress is ½ or less is about 262 μm. Therefore, even if the polarization member 304 is shifted by 200 μm, the stress acting on the image signal line 310 can be reduced to ½ or less at which it is at a maximum. In addition, if the curvature radius is 1.0 mm, the distance X at which the stress becomes ¼ or less is about 253 μm. Therefore, even if the polarization member 304 is shifted by 200 μm, the stress acting on the image signal line 310 can be reduced to ¼ or less at which it is at a maximum.

In this way, if the curvature radius r is determined so that the distance between the bending position 112a and the angle changing position 130 is equal to or less than X while considering the bonding precision of the polarization member 304 as described above, it is possible to reduce the stress acting on the image signal line 310 in the curved section 112.

(Modified Example)

Figure 8A:
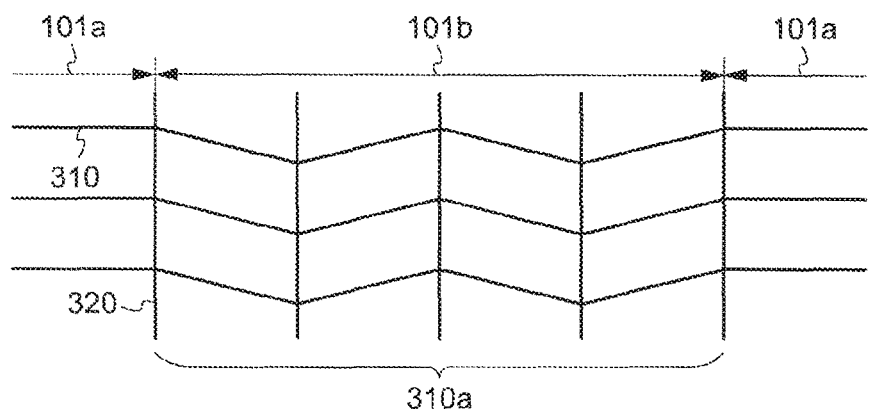
FIG. 8A is a diagram for explaining a schematic structure of an image signal line in a display device of the present embodiment.
Figure 8B:
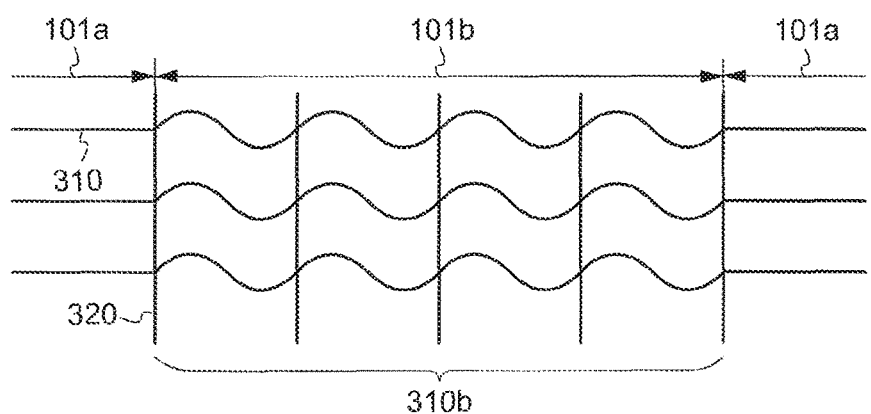
FIG. 8B is a diagram for explaining a schematic structure of an image signal line in a display device of the present embodiment.
Figure 8C:
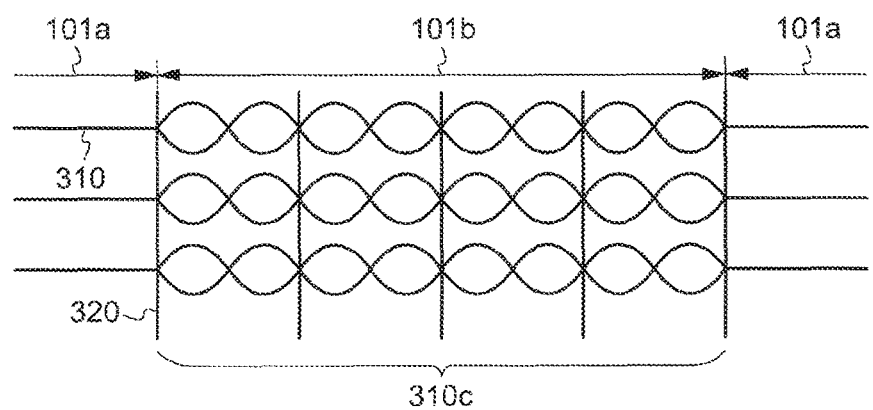
FIG. 8C is a diagram for explaining a schematic structure of an image signal line in a display device of the present embodiment.

FIG. 8A, FIG. 8B and FIG. 8C are diagrams for explaining a schematic structure of the image signal line 310 in the display device 100 of the present embodiment. In one example of the display device 100 shown in FIG. 4A, a linear shaped image signal line 310 extends in the second region 101b. Therefore, when the overall arrangement of the image signal line 310 in the second region 101b is represented schematically, it has a zigzag pattern 310a as is shown in FIG. 8A.

However, the display device 100 of the present embodiment is not limited to the pattern 310a shown in FIG. 8A, and various patterns can be adopted. For example, as is shown in FIG. 8B, a waveform pattern 310b in which the image signal line 310 is arranged in a wave pattern may be used. In addition, as is shown in FIG. 8C, the image signal line 310 may be formed in an 8-figure shaped pattern 310c arranged in a figure eight shape.

The display device 100 of the present embodiment is characterized by a structure in which the image signal line 310 does not extend orthogonally with respect to the curved axis direction 120 in the second region 101b corresponding to the curved section 112.

Therefore, as long as there is no contradiction with such a structure, the pattern shape of the image signal line 310 in the second region 101b can be appropriately changed.

(Second Embodiment)

In the first embodiment, a structure is shown in which the bending position 112a matches with the position (angle changing position 130) at which the angle of the image signal line 310 with respect to the curved axis direction 120 changes from the first angle (θ1) to the second angle (θ2). In the second embodiment, an example structure is shown in which a distance L is intentionally provided between the bending position 112a and the angle changing position 130. Furthermore, in the present embodiment, an explanation is provided focusing on the difference in structure from the display device 100 according to the first embodiment, and the same structure is denoted by the same reference numerals and in some cases an explanation thereof may be omitted.

In the second embodiment, the bending position 112a (that is, the position of the edge 113 of the polarization member 304) is set further to the outside than the angle changing position 130 by the distance L (curved section 112 side) in advance. The distance L can be appropriately determined while considering the bonding accuracy of the polarization member 304.

Figure 9:
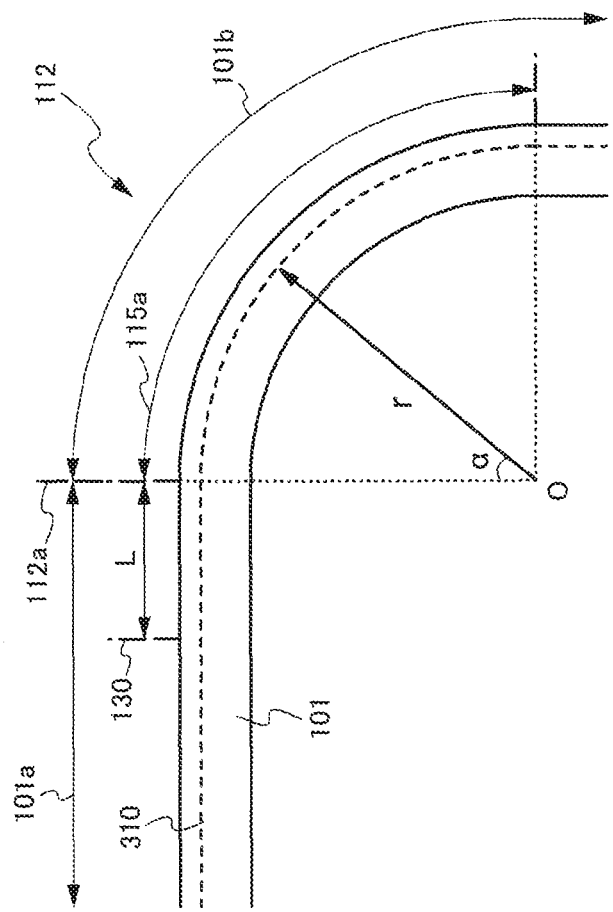
FIG. 9 is a planar view diagram schematically showing an expanded view of the vicinity of a curved section in a second embodiment.

FIG. 9 is a planar view diagram schematically showing an expanded view of the vicinity of a curved section in a second embodiment. In the present embodiment, the position of the edge 113 of the polarization member 304 is set in advance at a position further to the outside than the angle changing position 130 by a distance L. That is, when the position misalignment of the polarization member 304 does not occur, as is shown in FIG. 9, the curved section 112 starts from the bending position 112a and the angle changing position 130 is located further to the inside by a distance L than the bending position 112a. For example, it is assumed that the distance L is 200 µm.

In this case, at the starting position of the curved section 112 (the starting position of the second region 101b), the angle formed by the extending direction of the image signal line 310 and the curved axis direction 120 is the second angle (θ2) shown in FIG. 4A. That is, the angle changing position 130 is in the first region 101a. In other words, it can be said that the angle formed by the extending direction of the image signal line 310 and the curved axis direction 120 is a part having the angle θ2 shown in FIG. 4A in a part of the first region 101a.

In the case of the structure of the present embodiment, even if the polarization member 304 is misaligned inwards, since there is a margin corresponding to the distance L while considering bonding precision, the part (part having the first angle (θ1) shown in FIG. 4A) where the image signal line 310 and the curved axis direction 120 are orthogonal to each other is not included in the curved section 112. Of course, even if the polarization member 304 is misaligned outwardly, there is no possibility of having a part which becomes the first angle (θ1) shown in FIG. 4A in the curved section 112.

In addition, as long as it is within the range of the distance X described in the first embodiment, the curved section 112 may include a part that becomes the first angle (θ1) shown in FIG. 4A. That is, in FIG. 9, it can be said that practical problems do not occur even if the distance (L-X) is substituted for the distance L.

(Third Embodiment)

In the third embodiment, a structure is explained in which auxiliary wiring 330 is connected to a common electrode 211 and the wiring resistance of the common electrode 211 is reduced. As was explained in the first embodiment, since the common electrode 211 is formed from an oxide conductive film of ITO or the like, the wiring resistance is higher than the wiring resistance of a general metal electrode. Therefore, in the case when a potential is applied to the common electrode 211, the potential drop due to the wiring resistance as the distance from the supply point increases may become a problem. In the present embodiment, by electrically connecting the auxiliary wiring formed from a metal material to the common electrode 211, the wiring resistance of the common electrode 211 is substantially lowered to solve the potential drop problem described above. In the present embodiment, an explanation is given focusing on the difference in the structure from the display device 100 according to the first embodiment, and an explanation of the same structure denoted by the same reference numerals may be omitted.

Figure 10:
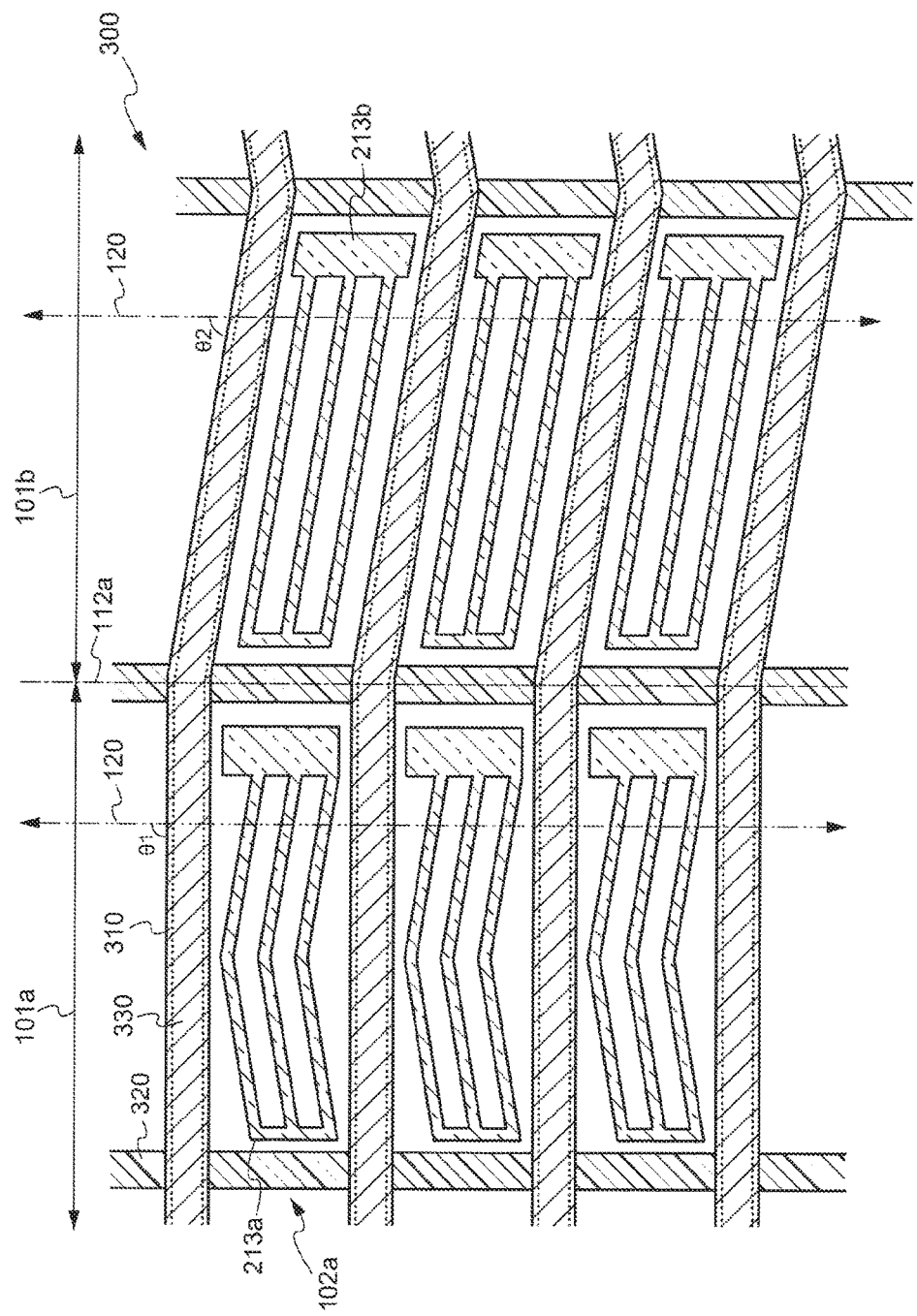
FIG. 10 is a planar view diagram schematically showing a part of an array substrate in a display device of a third embodiment.
Figure 11:
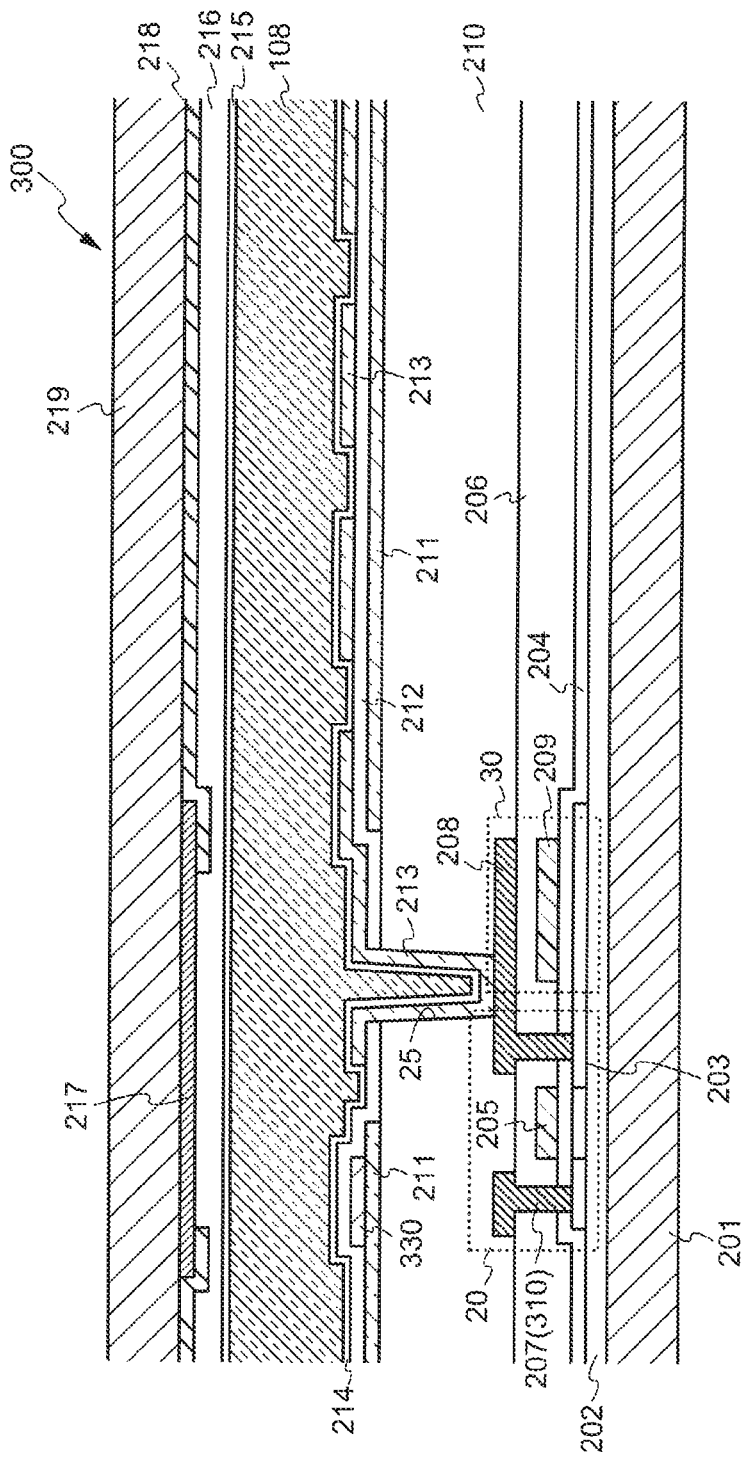
FIG. 11 is a cross-sectional diagram showing a structure of a pixel structure in a display device in a third embodiment.

FIG. 10 is a planar view diagram schematically showing a part of an array substrate 101 in a display device 300 of a third embodiment. FIG. 11 is a cross-sectional view showing the structure of the pixel structure of the display device 300 according to the third embodiment. Although not shown in FIG. 10, actually, as in the first embodiment, the common electrode 211 is arranged across a plurality of pixels.

As is shown in FIG. 10, in the display device 300 of the present embodiment, the auxiliary wiring 330 is arranged along the image signal line 310. Since the auxiliary wiring 330 is formed form a metal material, it has light shielding properties. Therefore, it is preferred to suppress a decrease in an aperture ratio of a pixel by overlapping it on the image signal line 310 in a planar view.

In addition, as is shown in FIG. 11, the auxiliary wiring 330 is formed so as to directly overlap the common electrode 211. However, this is only an example and the common electrode 211 and the auxiliary wiring 330 may be electrically connected via an insulating film. In the present embodiment, a part of the image signal line 310 functions as a source electrode 207 of a thin film transistor 20. Therefore, in FIG. 11, the auxiliary wiring 330 is arranged so as to overlap with the source electrode 207 (that is, the image signal line 310).

Since the auxiliary wiring 330 comprised from the structure described above is arranged along the image signal line 310, as explained in the first embodiment, the structure of the first region 101a differs from that of the second region 101b. Specifically, as is shown in FIG. 10, in the first region 101a, the auxiliary wiring 330 is arranged along a direction roughly orthogonal to the curved axis direction 120. On the other hand, in the second region 101b, the auxiliary wiring 330 is arranged along a direction which intersects obliquely the curved axis direction 120. Therefore, there is a relationship in which compared to the first angle (θ1) formed by the extending direction of the auxiliary wiring 330 in the first region 101a and the curved axis direction 120 of the curved section 112, the second angle (θ2) formed by the extending direction of the auxiliary wiring 330 in the second region 101b and the curved axis direction 120 of the curved section 112 is small.

As described above, in the present embodiment, by connecting the auxiliary wiring 330 to the common electrode 211, it is possible to prevent a problem caused by a potential drop of the common electrode 211. At that time, it is possible to suppress a decrease in aperture ratio by overlapping the auxiliary wiring 330 on the image signal line 310. Furthermore, by making the inclination angle of the auxiliary wiring 330 in the second region 101b with respect to the curved axis direction 120 larger than that in the first region 101a, it is possible to reduce the stress acting on the auxiliary wiring 330 in the curved section 112.

(Fourth Embodiment)

Figure 12:
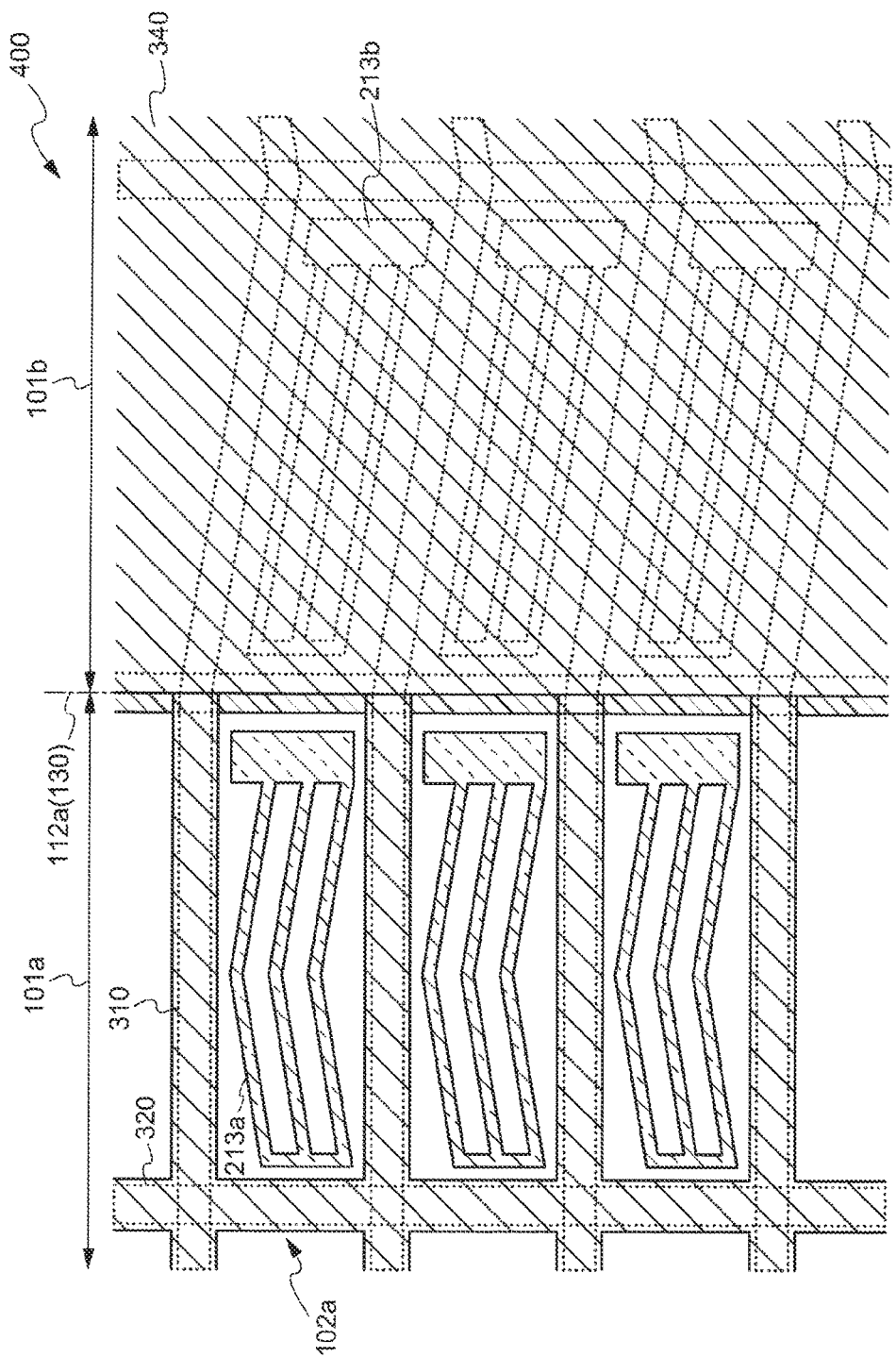
FIG. 12 is a planar view diagram schematically showing a part of an array substrate in a display device of a fourth embodiment.

In the fourth embodiment, the structure of a light shielding film which defines the opening region of each pixel 102a is explained using FIG. 12. In the present embodiment, an explanation is given focusing on the difference in structure from the display device 100 according to the first embodiment, and the same structure is denoted with the same reference numerals and an explanation thereof may be omitted.

FIG. 12 is a planar view schematically showing a part of the array substrate 101 in the display device 400 of the fourth embodiment. Although not shown in FIG. 12, actually, as in the first embodiment, the common electrode 211 is arranged across a plurality of pixels.

As is shown in FIG. 12, in the display device 400 of the present embodiment, the light shielding film 340 is arranged along the image signal line 310 and the scanning signal line 320 in the first region 101a. That is, in the first region 101a, it can also be said that the light shielding film 340 has an opening section corresponding to each pixel 102a. On the other hand, in the second region 101b, the light shielding film 340 is arranged across a plurality of pixels 102a. That is, in the present embodiment, the light shielding film 340 arranged in the curved section 112 is arranged so as to cover a plurality of pixels 102a. In other words, the light shielding film 340 of the present embodiment has a first part overlapping along the image signal line 310, a second part overlapping across a plurality of image signal lines 310, and the second part can be said to be located in the second region 101b.

In this way, in the present embodiment, the light shielding film 340 is arranged so as to cover the second region 101b corresponding to a curved section. Therefore, it is preferred that the light shielding film 340 has flexibility. For example, it is possible to use a resin material containing a black pigment or carbon black as a material for forming the light shielding film 340. However, the material is not limited to this and a metal material such as chromium or titanium may also be used. This is because since the curved section 112 does not function as a display region because it is located on the outer side of the polarization member 304, even if it is covered with the light shielding film 340, no particular inconvenience is produced.

As described above, in the display device 400 of the present embodiment, the structure of the light shielding film 340 is different between the first region 101a and the second region 101b. Specifically, the light shielding film 340 is arranged along the image signal line 310 and the scanning signal line 320 in the first region 101a, and is arranged across a plurality of pixels 102a in the second region 101b. According to the present embodiment, in addition to the function as a usual black matrix, the light shielding film 340 can have a function of shielding stray light emitted from the curved section 112.

Furthermore, in the present embodiment, although an example applied to the first embodiment was explained, it can also be applied to the second embodiment and the third embodiment. For example, the structure shown in FIG. 13 is obtained when applied to the second embodiment.

Figure 13:
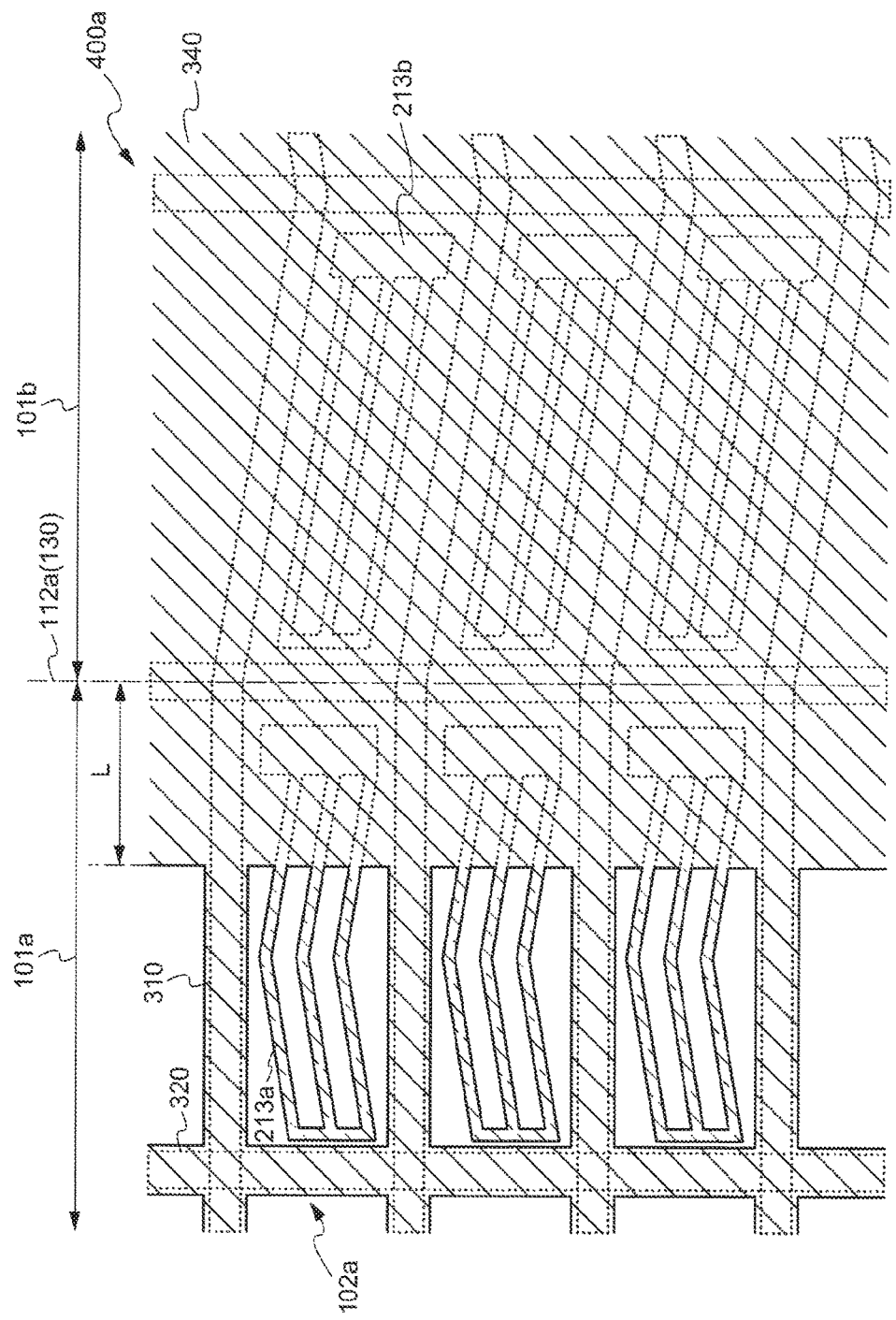
FIG. 13 is a planar view diagram schematically showing a part of an array substrate in a display device of a fourth embodiment.

FIG. 13 is a planar view diagram schematically showing a part of the array substrate 101 in the display device 400a of the fourth embodiment. Specifically, FIG. 13 shows an application example in the case where the bending position 112a (position of the edge 113 of the polarization member 304) is set further to the outer side than the angle changing position 130 by a distance L in advance. Therefore, even if the position misalignment of the polarization member 304 occurs toward the inner side, if it is within the range of the distance L, it is possible to shield the entire region of the curved section 112. That is, by overlapping a part of the pixels 102a arranged in the first region 101a with the light shielding film 340, the pixels 102a in the second region 101b are not included in the display section 102.

Furthermore, in the present embodiment a structure was shown in which the light shielding film 340 overlapping the second region 101b is arranged across a plurality of image signal lines 310. However, the present invention is not limited to this structure. The light shielding film 340 may also be arranged along the image signal line 310 in the second region 101b similar to the first region 101a.

(Fifth Embodiment)

In the fifth embodiment, an example of a display device using alignment techniques of liquid crystal molecules different from those in the first embodiment is explained. Specifically, an example is shown of a display device using a technique (so-called pseudo dual domain technique) for improving a viewing angle by making the alignment direction of liquid crystal molecules different between two pixels. In the present embodiment, an explanation is given focusing on the difference in structure from the display device 100 according to the first embodiment, and the same structure is denoted with the same reference numerals and an explanation thereof may be omitted.

Figure 14:
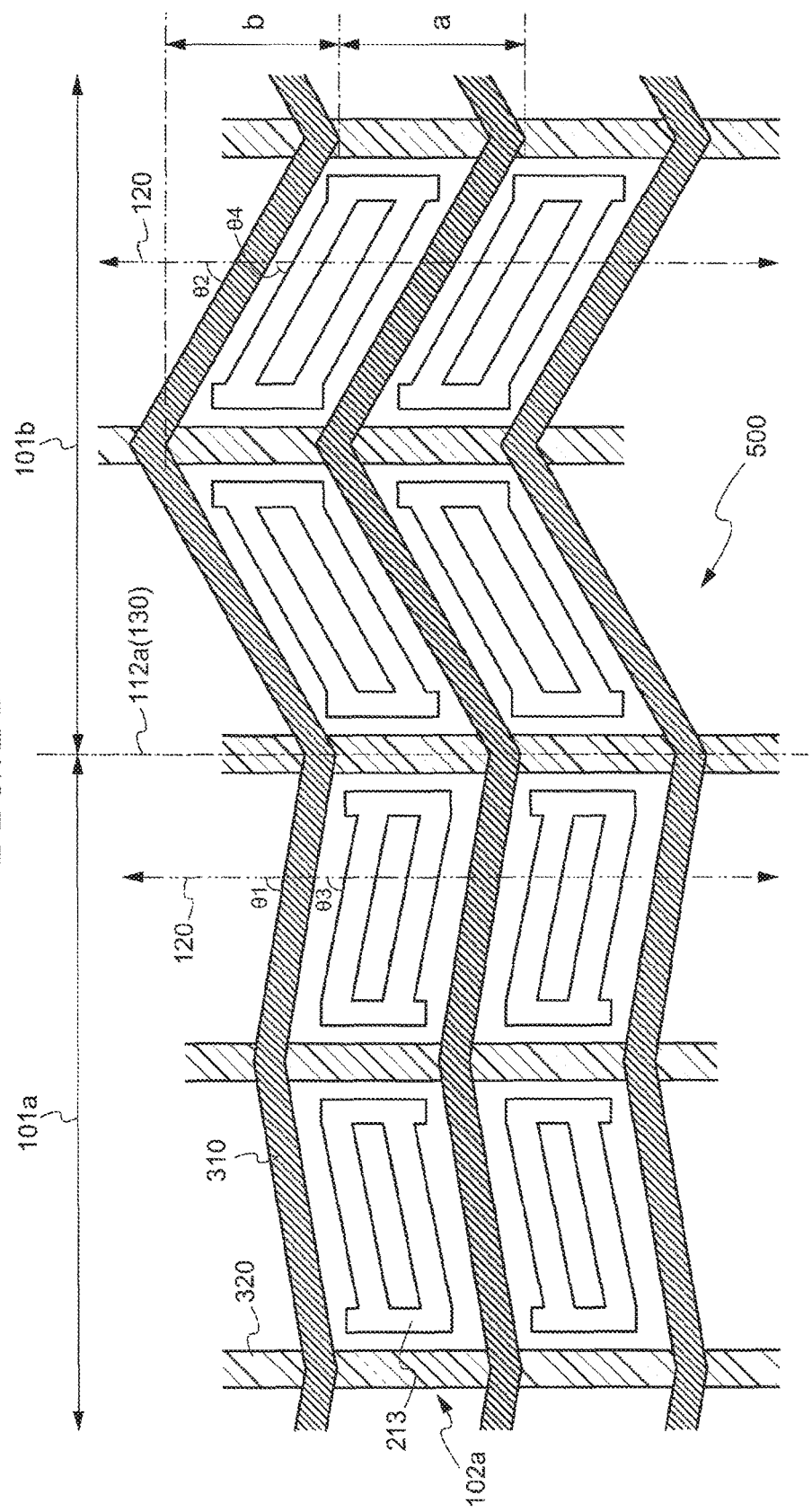
FIG. 14 is a planar view diagram schematically showing a part of an array substrate in a display device of a fifth embodiment.

FIG. 14 is a planar view diagram schematically showing a part of the array substrate 101 in the display device 500 of the fifth embodiment. In the pixel structure shown in FIG. 14, the image signal line 310 is curved each time it intersects a scanning signal line 320. Such an arrangement of the image signal lines 310 considers the arrangement of the pixel electrodes 213 described later. However, the image signal line 310 does not have a curved section in the vicinity of the center between two adjacent scanning signal lines 320.

A pixel electrode 213 is arranged in a region surrounded by two adjacent image signal lines 310 and two adjacent scanning signal lines 320. The pixel electrode 213 has a linear shaped electrode section. That is, the pixel electrode 213 does not have a curved section in the vicinity of the center between two adjacent scanning signal lines 320. In addition, in two adjacent pixels 102a, the pixel electrodes 213 arranged symmetrically around the scanning signal line 320. Therefore, transverse electric fields in different directions are formed in two adjacent pixels 102a, and liquid crystal molecules aligned in different directions. As a result, it is possible to form a multi-domain in a pseudo manner using two adjacent pixels 102a.

In the display device 500 of the present embodiment, the angle of the image signal line 310 with respect to the curved axis direction 120 changes with the bending position 112a as a boundary the same as in the first embodiment. However, this embodiment is different from the first embodiment in that the image signal line 310 intersects diagonally not perpendicularly to the curved axis direction 120 in the first region 101a. Here, in the first region 101a, an angle when the image signal line 310 and the curved axis direction 120 form an acute angle is a first angle ($\theta1$). Further, in the second region 101b, an angle at which the image signal line 310 and the curved axis direction 120 form an acute angle is a second angle ($\theta2$). At this time, similar to the display device 100 of the first embodiment, the display device 500 of the present embodiment has a relationship in which the second angle ($\theta2$) is smaller than the first angle ($\theta1$).

In addition, in FIG. 14, the electrode section of the pixel electrode 213 is arranged along the image signal line 310 between two adjacent image signal lines 310. Therefore, in the present embodiment, the electrode section of the pixel electrode 213 positioned in the second region 101b is also more inclined with respect to the curved axis direction 120 than the electrode section of the pixel electrode 213 in the first region 101a. Therefore, the same as in the first embodiment, the relationship is established that compared with the third angle ($\theta3$) formed by the extending direction of the electrode section of the pixel electrode 213 in the first region 101a and the curved axis direction 120 of the curved section 112, the fourth angle ($\theta4$) formed by the extending direction of the electrode section of the pixel electrode 213 in the second region 101b and the curved axis direction 120 of the curved section 112 is small.

As described above, in the display device 500 of the present embodiment, the angle of the image signal line 310 with respect to the curved axis direction 120 changes with the boundary between the first region 101a and the second region 101b as a boundary. In this way, stress acting on the image signal line 310 at the curved section 112 is reduced, and it is possible to reduce damage to the image signal line 310 at the curved section 112.

In the present embodiment, the curve width (b) of the image signal line 310 is narrowed compared with the width (a) of the pixel 102a in the second region 101b. If the curve width (b) of the image signal line 310 is too large, the pixel 102a located in the vicinity of the end part of the display section 102 becomes an obstacle and there is a fear of it becoming a hindrance when arranging another circuit or wiring around the display section 102. Therefore, it is preferred that the curve width (b) of the image signal line 310 is narrower than the width (a) of the pixel 102a (Sixth Embodiment)

In the sixth embodiment, an example in which the pixel structure of the second region 101b is different from that of the first embodiment is explained. For example, the pixel electrode 213 may not be arranged in the pixel 102a arranged in the second region 101b. In the present embodiment, an explanation is given focusing on the difference in structure from the display device 100 according to the first embodiment, and the same structure is denoted with the same reference numerals and an explanation thereof may be omitted.

Figure 15:
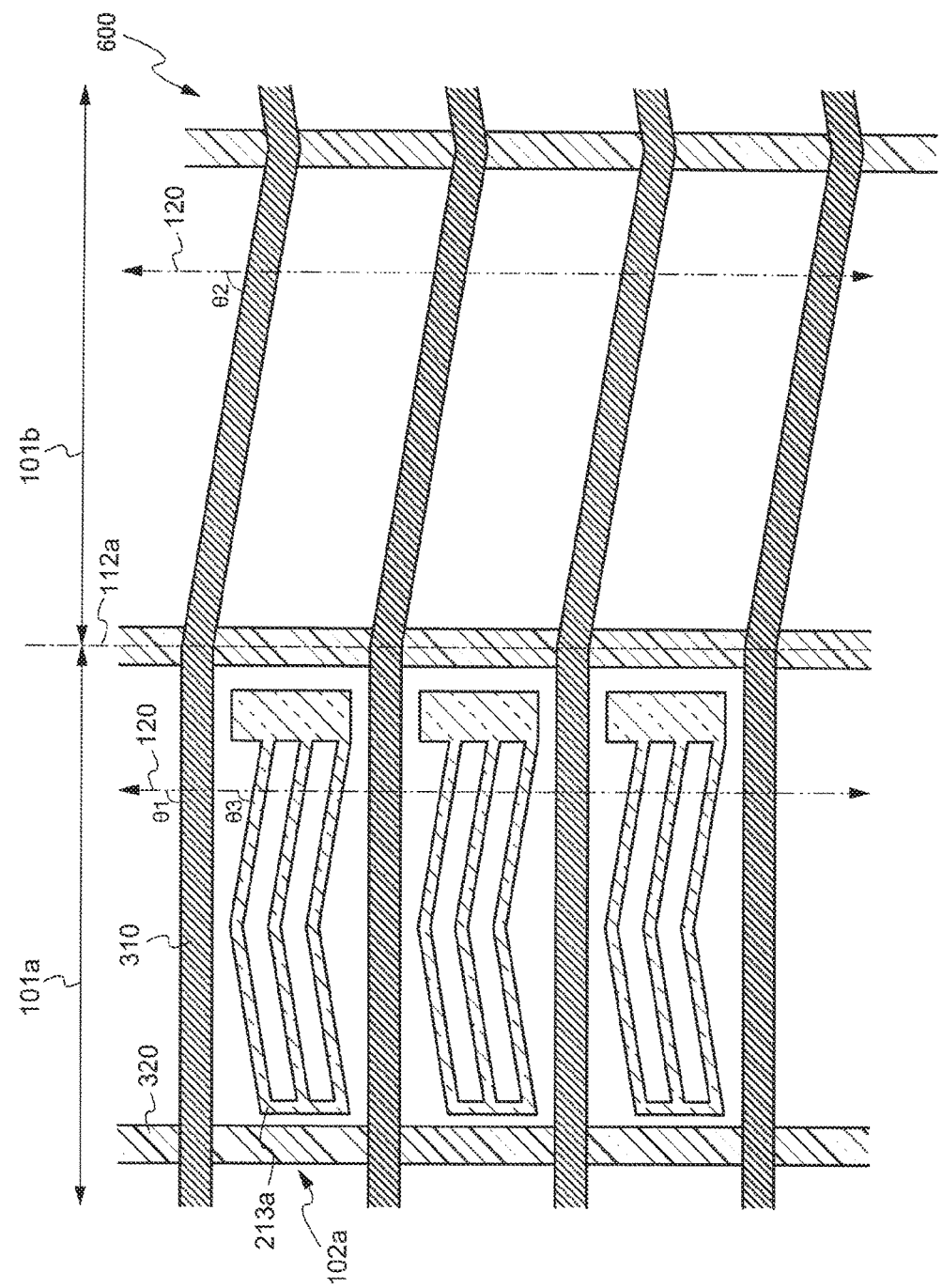
FIG. 15 is a planar view diagram schematically showing a part of an array substrate in a display device of a sixth embodiment.

FIG. 15 is a planar view diagram schematically showing a part of the array substrate 101 in the display device 600 of the sixth embodiment. In the display device 600 of the present embodiment, the pixel 102a arranged in the second region 101b does not include the pixel electrode 213. In the first place, since the second region 101b does not overlap with the polarization member 304, there is no problem even if the second region 101b does not function as a display region.

In addition, the pixel structure of the pixel 102a arranged in the second region 101b may have various structures without being limited to the structure shown in FIG. 15. For example, in the display device 100 according to the first embodiment, the pixel 102a arranged in the second region 101b can be formed not to include both the thin film transistor 20 and the pixel electrode 213 shown in FIG. 2. In addition, in the display device 100 according to the first embodiment, the pixel 102a arranged in the second region 101b may not be arranged with the thin film transistor 20, and only the pixel electrode 213 may be arranged. In the latter case, by making the surface shapes of the pixels 102a arranged in the first region 101a and the second region 101b the same, there is an effect of making the spread of liquid crystals uniform during liquid crystal injection.

Furthermore, in order to make the heights (film thicknesses) of the first region 101a and the second region 101b the same, dummy pixels which do not function as display pixels may be arranged. The dummy pixel can be obtained by not electrically connecting the thin film transistor 20 and the pixel electrode 213 in the process for forming the pixel 102a. The reason for using a dummy pixel is to prevent a leak current or electrostatic breakdown or the like generated in the second region 101b from affecting the first region 101a.

(Seventh Embodiment)

In the first to sixth embodiments, an explanation was given focusing on the structure of the image signal line 310 in the curved section 112. However, the present invention is applicable not only to the image signal line 310 but also to any signal line which can be orthogonal to the curved axis direction 120 in the curved section 112. In the present embodiment, an example is explained in which the present invention is applied to signal lines other than the image signal line 310. In the present embodiment, an explanation is given focusing on the difference in structure from the display device 100 according to the first embodiment, and the same structure is denoted with the same reference numerals and an explanation thereof may be omitted.

Figure 16:
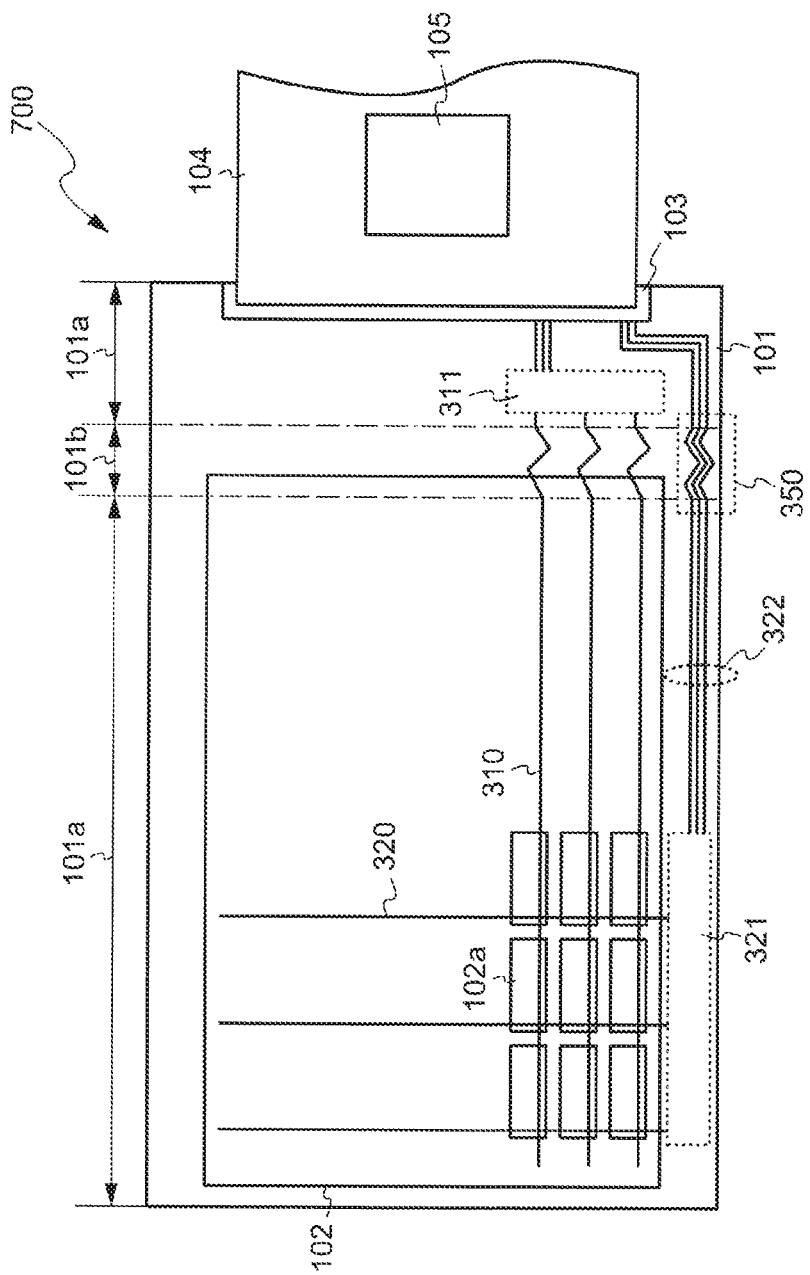
FIG. 16 is a planar view diagram schematically showing an array substrate in a display device of a seventh embodiment.

FIG. 16 is a planar view diagram schematically showing the array substrate 101 in the display device 700 of the seventh embodiment. In FIG. 16, an image signal line 310 and a scanning signal line 320 are connected to each pixel 102a. In the present embodiment, the image signal line 310 passes through the second region 101b corresponding to the curved section 112, and is then connected to a terminal section 103 via a data driver 311 including a latch circuit or the like.

In addition, the scanning signal line 320 is connected to a gate driver 321 including a shift register and the like. Control signals such as a start pulse and a clock pulse input from the terminal section 103 are input to the gate driver 321 via a control signal line 322. The control signal line 322 passes through the second region 101b corresponding to the curved section 112 in the region 350 after being output from the terminal section 103. Therefore, when passing through the second region 101b, the control signal line 322 may be almost orthogonal to the curved axis direction 120 shown in FIG. 4A.

In the display device 700 of the present embodiment, the control signal line 322 extending from the first region 101a to the second region 101b also adopts the same structure as the image signal line 310 explained in the first embodiment. Specifically, in the display device 700 of the present embodiment, in the first region 101a, the control signal line 322 is arranged along a direction roughly orthogonal to the curved axis direction 120. On the other hand, in the second region 101b, the control signal line 322 is arranged along a direction obliquely intersecting the curved axis direction 120.

As described above, in the present embodiment, not only the image signal line 310 but also other signal lines (for example, the control signal line 322) are formed in the first region 101a and the second region 101b with different angles with respect to the curved axis direction 120. In this way, it is possible to reduce inconveniences such as signal lines such as the image signal line 310 and the control signal line 322 being disconnected by stress at the curved section 112.

(Eighth Embodiment)

In the eighth embodiment, a display device 800 that can be folded around the center vicinity of a screen is explained. Such a display device 800 can be used as a display screen of a so-called foldable display. Furthermore, in the present embodiment, an explanation is given focusing on the difference in structure from the display device 100 according to the first embodiment, and the same structure is denoted with the same reference numerals and an explanation thereof may be omitted.

Figure 17:
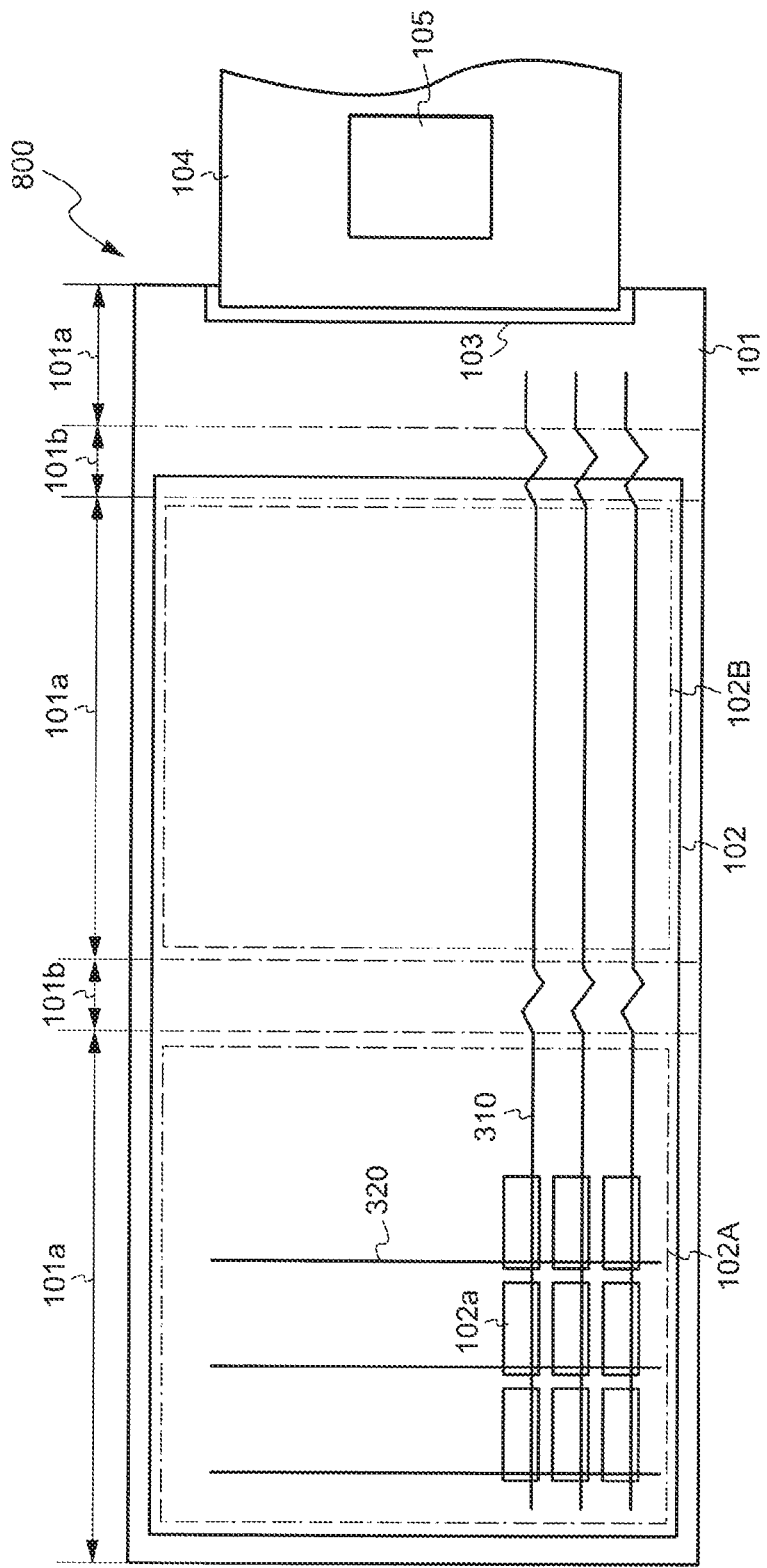
FIG. 17 is a planar view diagram schematically showing an array substrate in a display device of an eighth embodiment.

FIG. 17 is a planar view diagram schematically showing the array substrate 101 in the display device 800 of the eighth embodiment. In the first embodiment, the second region 101b is arranged between the display section 102 and the terminal section 103, whereas in the present embodiment, the second region 101b is also arranged in the center vicinity of the display section 102. That is, the display section 102 is divided into two regions 102A and 102B, and the second region 101b is arranged between the two regions 102A and 102B.

The display device 800 of the present embodiment is also formed so that the image signal line 310 passing through the second region 101b arranged in the center vicinity of the display section 102 also intersects the curved axis direction 120 at an angle different from that of the first region 101a. This point is as explained with reference to FIG. 4A and FIG. 5 in the first embodiment.

According to the present embodiment, even in the case where the second region 101b corresponding to the curved section is arranged in the center vicinity of the display section 102 such as the display device 800, it is possible to reduce stress acting on the image signal line 310.

(Ninth Embodiment)

In the ninth embodiment, an electronic device using each display device explained in the first embodiment to the eighth embodiment is explained as a display medium. FIG. 18 is a perspective view showing an example of an electronic device 60 on which the display device 100 according to the first embodiment is mounted. Specifically, a mobile phone (smartphone) is exemplified as the electronic device 60. However, the electronic device 60 is not limited to a mobile phone and any information terminal having a display screen such as a tablet PC can be applied. Furthermore, although an example using the display device 100 of the first embodiment is shown here, the same applies to the case of using a display device according to another embodiment.

As is shown in FIG. 1, the display device 100 of the first embodiment is folded to the rear side at the bending position 112a. That is, the terminal section 103 and the flexible printed circuit substrate 104 which are regions which can not perform display, are arranged on the rear surface side of the array substrate 101. Therefore, when the electronic device 60 is viewed in a planar view, a frame section 62 has a narrow structure (narrow frame structure).

Here, the electronic device 60 shown in FIG. 18 includes a display screen 61 and a frame section 62. The display screen 61 is a screen for displaying images using the display section 102 shown in FIG. 1. In the present embodiment, the display screen 61 is flat but may be also curved. The frame section 62 functions as a casing of the electronic device 60. The frame section 62 is also called a bezel.

In the electronic device 60, the frame section 62 is arranged on all four sides. As described above, since the display device 100 is folded at the bending position 112a, it is possible to narrow the frame section 62 arranged at the end section 63 of the electronic device 60 at least in the direction D1. In FIG. 17, the frame section 62 arranged at the end section 63 has a curved surface but may also be formed with a flat surface. In addition, the frame section 62 may be arranged with an input section 64 formed from hardware such as a power button or the like. An object 65 which forms a user interface such as an icon can be displayed on the display screen 61.

As described above, by folding one side of the display section 102 of the display device 100 on the inner side of the sealant 106 of the electronic device 60, it is possible to narrow the frame section 62 arranged at the end section 63 as shown in FIG. 18. Furthermore, in the electronic device 60 of the present embodiment, the wiring layout is considered so as to narrow as much as possible the part of the frame section 62 located on the same plane as the display screen 61. In this way, the display section 102 shown in FIG. 1 can be used as the display screen of the electronic device 60 by making maximum use of both the direction D1 and the direction D2.

The embodiments described above as embodiments of the present invention can be implemented as being combined as appropriate as long as combinations are not contradictory to one another. Also, addition, deletion, or design change of a component or addition, omission, or change in condition of a step made as appropriate by a person skilled in the art based on the display device of each embodiment is included in the scope of the present invention as long as they have the gist of the present invention.

Even operations and effects that are different from those brought by the modes of each of the above-described embodiments but are evident from the description of the specification or can be easily predicted by a person skilled in the art are construed as those naturally brought by the present invention.

What is claimed is:

1. A display device comprising:
   a first substrate having flexibility;
   a second substrate having flexibility; and
   a sealant adhering together the first substrate and the second substrate;
   wherein
   a display section displays an image in an area surrounded by the sealant and has a curved section in part,
   the first substrate includes a first region not corresponding to the curved section and a second region corresponding to the curved section, and also a signal line from the first region to the second region,
   a second angle formed by an extending direction of the signal line and a curved axis direction of the curved section in the second region is smaller than a first angle formed by an extending direction of the signal line and the curved axis direction in the first region,
   a terminal section connecting a flexible printed circuit substrate is included in the first region, and
   the display section and the terminal section overlap in a planar view.

2. The display device according to claim 1, wherein the substrate includes a plurality of pixel electrodes, and a fourth angle formed by an extending direction of a pixel part of the pixel electrode and a curved axis direction of the curved section in the second region is smaller than a third angle formed by an extending direction of a pixel part of the pixel electrode and the curved axis direction in the first region.

3. The display device according to claim 2, wherein the first substrate includes auxiliary wiring extending along and overlapping with the signal line, and an extending direction of the auxiliary wiring and a curved axis direction of the curved section form the first angle in the first region, and an extending direction of the auxiliary wiring and a curved axis direction of the curved section form the second angle in the second region.

4. The display device according to claim 2, wherein a signal line is located at a starting position of the curved section, the signal line and curved section axis direction forming the first angle.

5. The display device according to claim 2, further comprising:
   a light shielding layer including a first part overlapping along the signal line, and a second part overlapping across the plurality of signal lines, the second part being located in the second region.

6. The display device according to claim 2, wherein the signal line is a plurality of image signal lines.

7. The display device according to claim 1, wherein the first substrate includes auxiliary wiring extending along and overlapping with the signal line, and an extending direction of the auxiliary wiring and a curved axis direction of the curved section form the first angle in the first region, and an extending direction of the auxiliary wiring and a curved axis direction of the curved section form the second angle in the second region.

8. The display device according to claim 7, wherein a signal line is located at a starting position of the curved section, the signal line and curved section axis direction forming the first angle.

9. The display device according to claim 7, further comprising:

a light shielding layer including a first part overlapping along the signal line, and a second part overlapping across the plurality of signal lines, the second part being located in the second region.

10. The display device according to claim 7, wherein the signal line is a plurality of image signal lines.

11. The display device according to claim 1, wherein a signal line is located at a starting position of the curved section, the signal line and curved section axis direction forming the first angle.

12. The display device according to claim 11, further comprising:
a light shielding layer including a first part overlapping along the signal line, and a second part overlapping across the plurality of signal lines, the second part being located in the second region.

13. The display device according to claim 1, further comprising:
a light shielding layer including a first part overlapping along the signal line, and a second part overlapping across the plurality of signal lines, the second part being located in the second region.

14. The display device according to claim 13, wherein the second part overlaps a part of an electrode in the first region.

15. The display device according to claim 1, wherein the signal line is a plurality of image signal lines.

16. The display device according to claim 15, wherein the first substrate includes a plurality of scanning signal lines intersecting the plurality of image signal lines, a pixel electrode is included in a region surrounded by two adjacent image signal lines and two adjacent scanning signal lines in the first region, and a region not having a pixel electrode in a region surrounded by two adjacent image signal lines and two adjacent scanning signal lines is included in the second region.

17. The display device according to claim 15, wherein the first substrate includes a plurality of scanning signal lines intersecting the plurality of image signal lines, and the plurality of image signal lines do not include a curved section at a center vicinity between adjacent scanning signal lines.

18. The display device according to claim 17, wherein a curve width of the image signal line is narrower than a width between the image signal lines in the second region.

19. The display device according to claim 1, wherein a pixel electrode is arranged in a region surrounded by two adjacent image signal lines and two adjacent scanning signal lines in the first region, and a pixel electrode in the first region includes a curved section and a pixel electrode in the second region does not include a curved section.

* * * * *